(12) United States Patent
Iwasaki

(10) Patent No.: US 7,766,534 B2
(45) Date of Patent: Aug. 3, 2010

(54) PLANAR LIGHTING DEVICE

(75) Inventor: Osamu Iwasaki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 235 days.

(21) Appl. No.: 12/134,781

(22) Filed: Jun. 6, 2008

(65) Prior Publication Data

US 2008/0304288 A1      Dec. 11, 2008

(30) Foreign Application Priority Data

Jun. 8, 2007     (JP) .............................. 2007-152995

(51) Int. Cl.
*F21V 29/00*  (2006.01)
(52) U.S. Cl. .................. 362/632; 362/294; 362/373
(58) Field of Classification Search ................ 362/632, 362/633, 634, 628, 613, 614, 615, 600, 294, 362/373, 218
See application file for complete search history.

(56) References Cited

U.S. PATENT DOCUMENTS

| 5,993,020 A | 11/1999 | Koike |
| 6,217,184 B1 | 4/2001 | Koike et al. |
| 7,273,310 B2 * | 9/2007 | Chen ........................... 362/580 |
| 7,438,450 B2 * | 10/2008 | Aoki et al. ................... 362/373 |
| 7,445,356 B2 * | 11/2008 | Chen ........................... 362/294 |

FOREIGN PATENT DOCUMENTS

| JP | 07-036037 A | 2/1995 |
| JP | 08-248233 A | 9/1996 |
| JP | 08-271739 A | 10/1996 |
| JP | 11-153963 A | 6/1999 |

\* cited by examiner

*Primary Examiner*—Bao Q Truong
(74) *Attorney, Agent, or Firm*—Sughrue Mion, PLLC

(57) ABSTRACT

The planar lighting device includes a pair of light sources, a light guide plate and a housing. The light guide plate is disposed between the light sources and includes a light exit plane and a pair of opposite light entrance planes respectively provided opposite to the light sources. The planar lighting device thus configured features a heat dissipation structure whereby a heat sink is connected to each of the light sources and heat pipes are attached to the heat sink so as to extend toward the center of the housing. Disclosed is a thin and lightweight planar lighting device suitably used for a large display television or the like, capable of emitting illumination light free from brightness unevenness or with a reduced level of brightness unevenness, allowing increase of dimensions of the display area, and capable of optimally releasing heat generated by the light sources.

22 Claims, 16 Drawing Sheets

FIG.10A
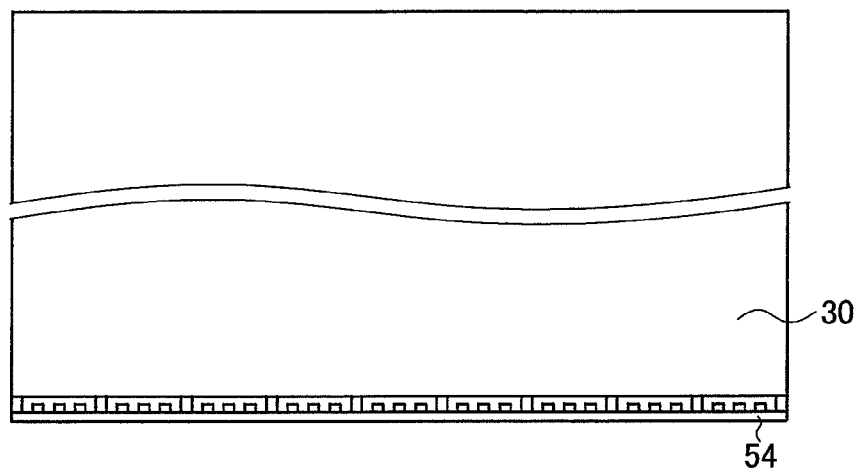
FIG.10B
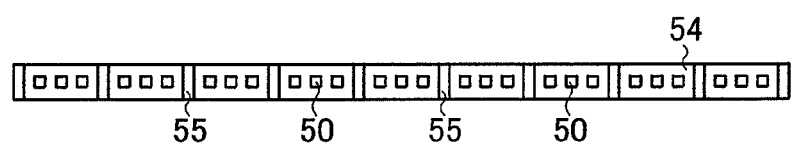
FIG.11A
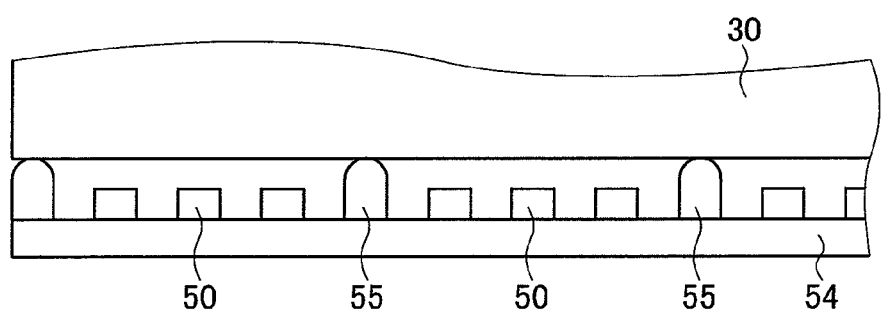
FIG.11B       FIG.11C       FIG.11D
   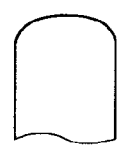   

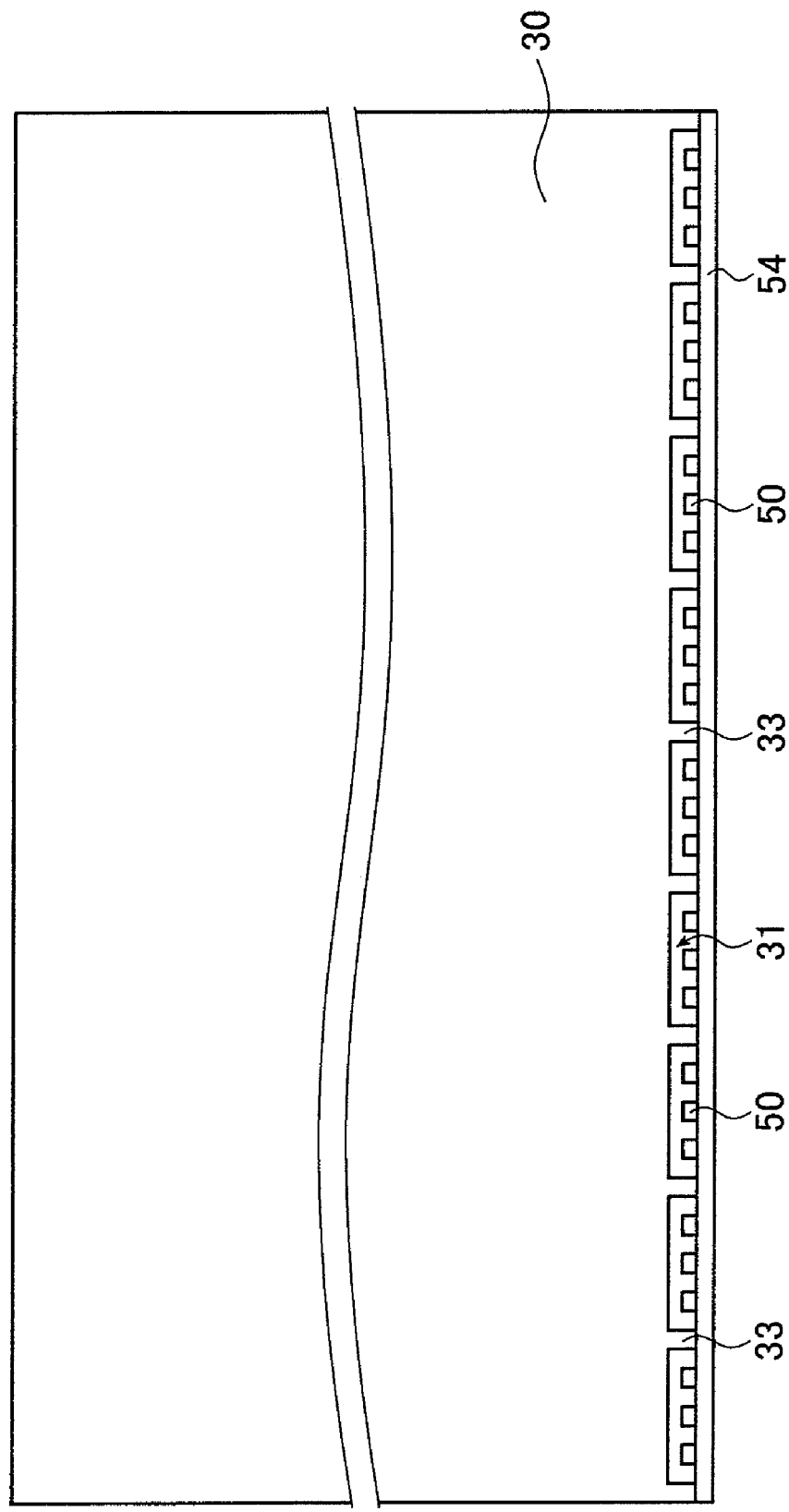

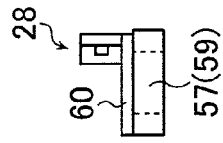
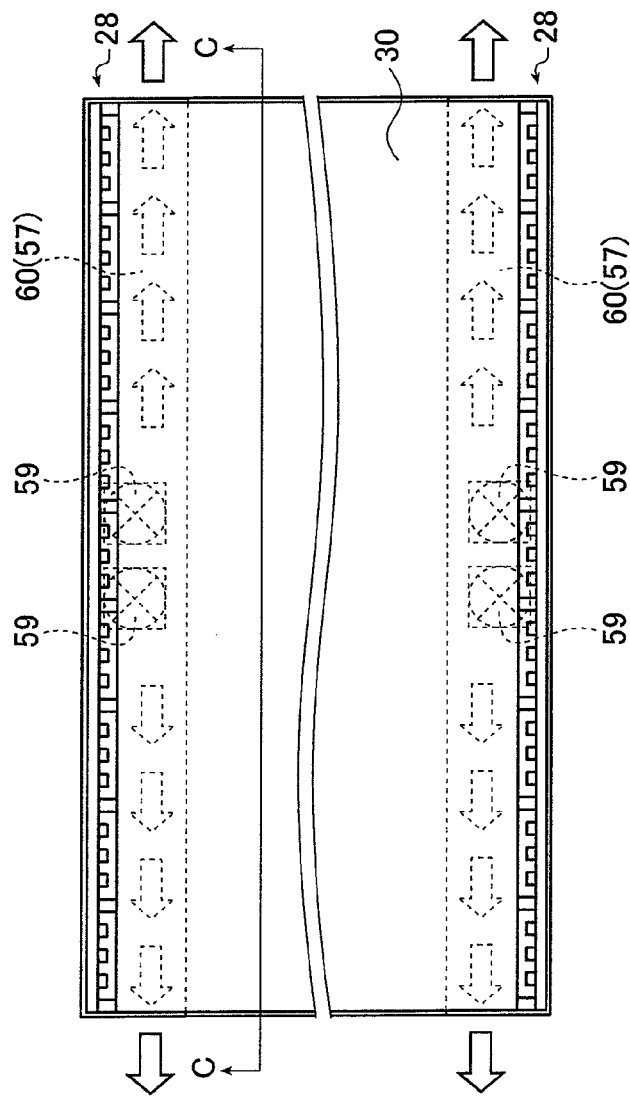
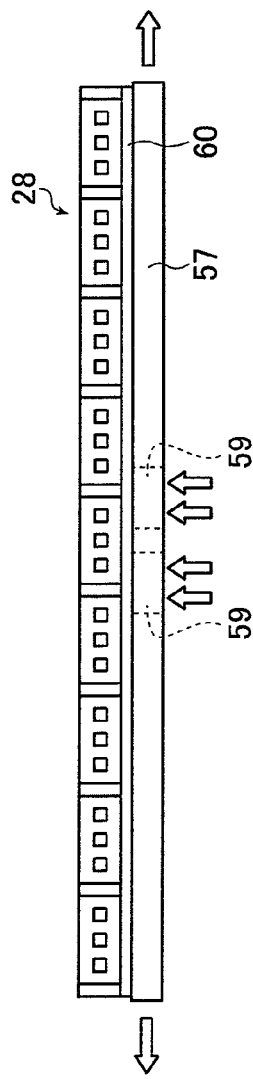

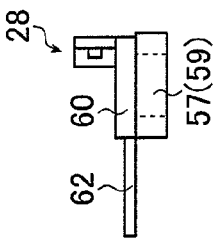
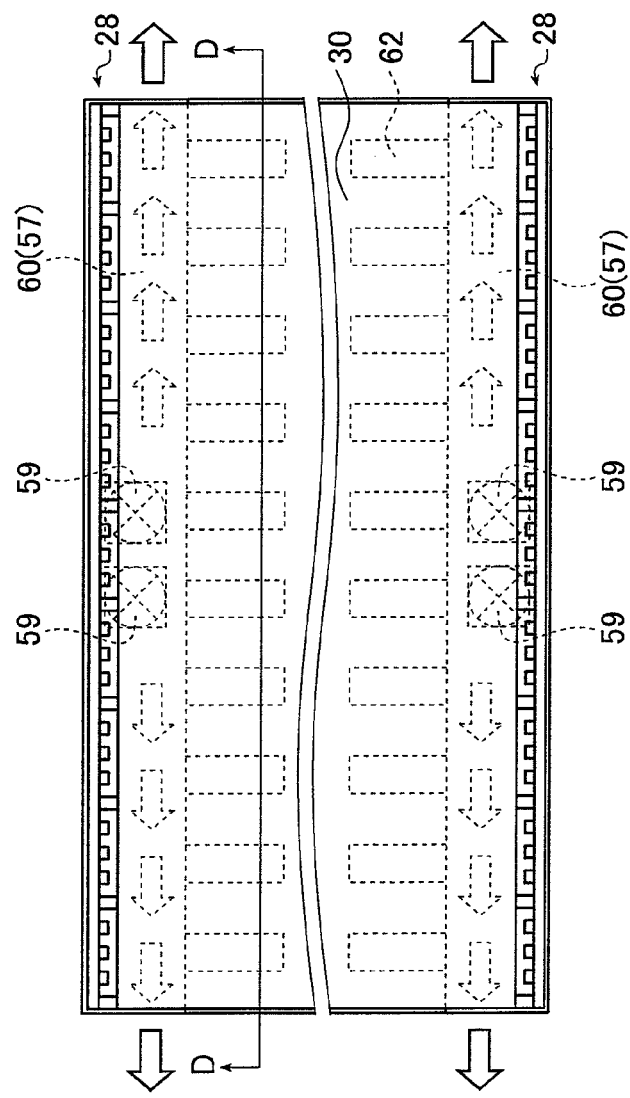
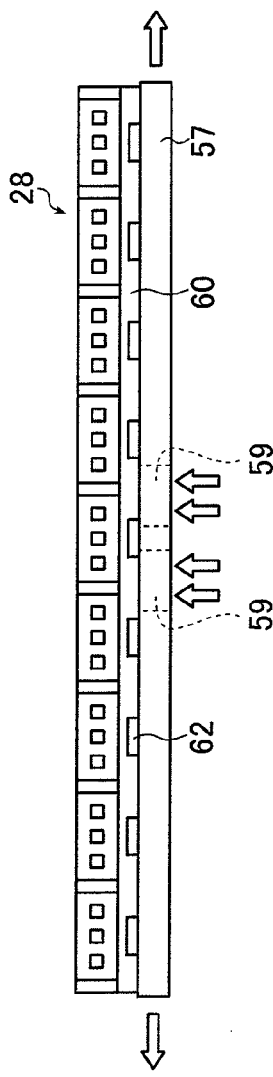

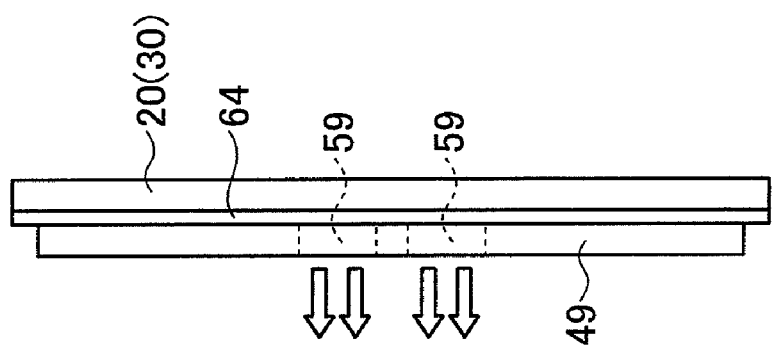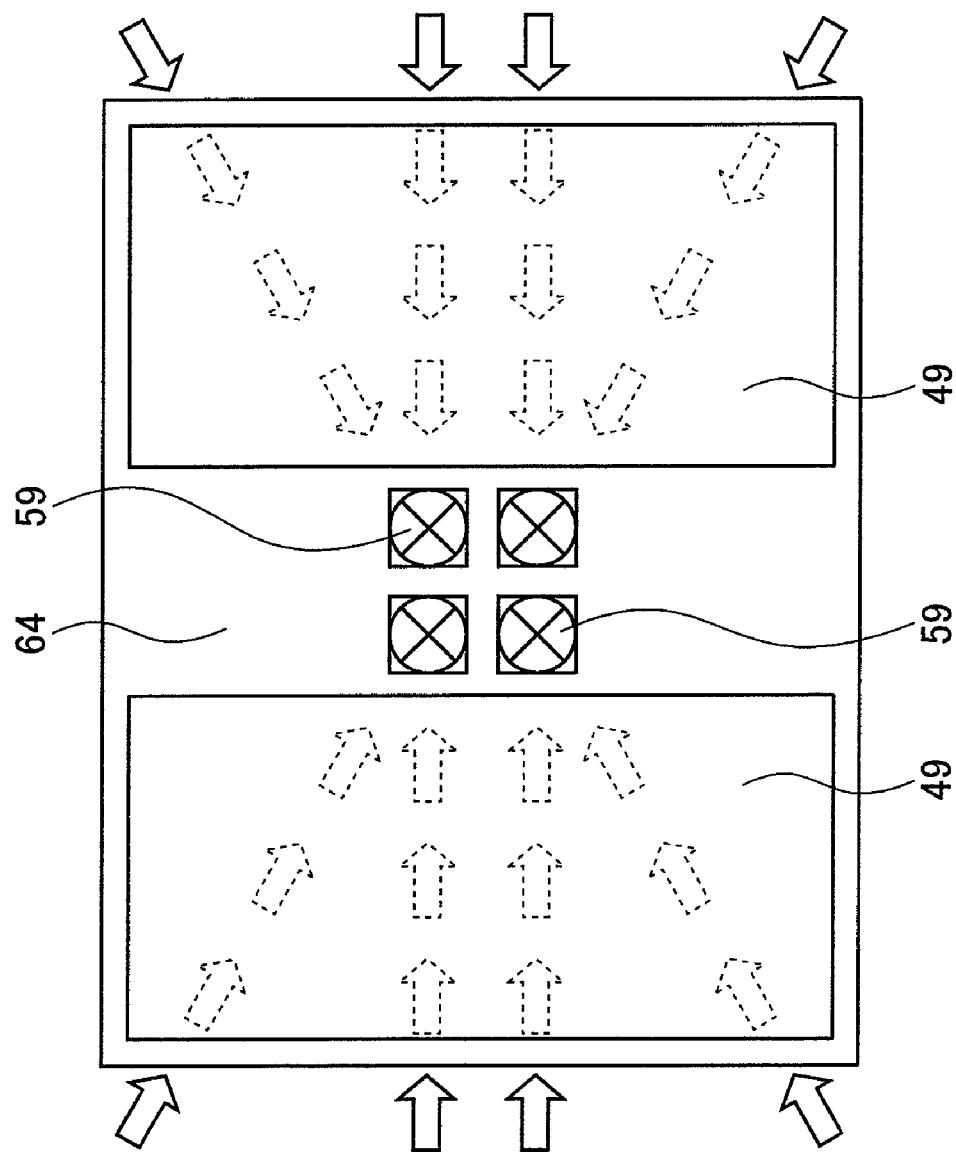

PLANAR LIGHTING DEVICE

The entire contents of literature cited in this specification are incorporated herein by reference.

BACKGROUND OF THE INVENTION

The present invention relates to a planar lighting device comprising light sources and a light guide plate for admitting light emitted by the light sources and emitting light through the light exit plane thereof. The inventive planar lighting device is used for indoor and outdoor illumination or as a backlight to illuminate the liquid crystal display panel used in liquid crystal display devices or a backlight used for advertising panels, advertising towers, advertising signs, and the like.

Liquid crystal display devices use a backlight unit for radiating light from behind the liquid crystal display panel to illuminate the liquid crystal display panel. A backlight unit is configured using optical members such as a light guide plate for diffusing light emitted by an illumination light source to irradiate the liquid crystal display panel, a prism sheet, and a diffusion sheet.

Currently, large liquid crystal display televisions predominantly use a so-called direct illumination type backlight unit having no light guide plate but comprising optical members such as a diffusion plate disposed immediately above the illumination light source. This type of backlight unit comprises cold cathode tubes serving as a light source provided on the rear side of the liquid crystal display panel whereas the inside of the backlight unit provides white reflection surfaces to secure uniform light amount distribution and a necessary brightness.

To achieve a uniform light amount distribution with the direct illumination type backlight unit, however, the backlight unit needs to have a given thickness, say about 30 mm, in a direction perpendicular to the liquid crystal display panel. While demands of still thinner backlight units are expected to grow in the future, achieving a further reduced thickness of say 10 mm or less with a backlight unit is difficult in view of uneven light amount distribution expected to accompany the direct illumination type.

Among backlight units that allow reduction of thickness thereof is a backlight unit using a light guide plate where light emitted by illumination light sources and admitted into the light guide plate is guided in given directions and emitted through a light exit plane that is different from the plane through which light is admitted.

There has been proposed a backlight of that type using a light guide plate formed by mixing scattering particles for diffusing light into a transparent resin, for which reference may be had, for example, to JP 07-36037 A, JP 08-248233 A, JP 08-271739 A, and JP 11-153963 A.

JP 07-36037 A, for example, discloses a light diffusion light guide light source device comprising a light diffusion light guide member having at least one light entrance plane region and at least one light exit plane region and light source means for admitting light through the light entrance plane region, the light diffusion light guide member having a region that has a tendency to decrease in thickness with the increasing distance from the light entrance plane.

JP 08-248233 A discloses a planar light source device comprising a light diffusion light guide member, a prism sheet provided on the side of the light diffusion light guide member closer to a light exit plane, and a reflector provided on the rear side of the light diffusion light guide member. JP 08-271739 A discloses a liquid crystal display comprising a light emission direction correcting element formed of sheet optical materials provided with a light entrance plane having a repeated undulate pattern of prism arrays and a light exit plane given a light diffusing property. JP 11-153963 A discloses a light source device comprising a light diffusion light guide member having a scattering power therein and light supply means for supplying light through an end plane of the light diffusion light guide member.

In the planar lighting devices provided with a light diffusion light guide plate containing light scatterers mixed therein as disclosed in the above prior art literature, light emitted by the light source and admitted through the light entrance plane into the light diffusion light guide member receives a single or a multiple scattering effect at a given rate as the light propagates through the inside of the light diffusion light guide member. Moreover, a significant proportion of light that reaches both end planes of the diffusion light guide member or a surface of the reflector receives reflection effect and is returned back into the diffusion light guide member.

The above composite process produces light beam that is emitted through the light exit plane highly efficiently with a directivity to travel obliquely forward as viewed from the light source. Briefly, light radiated by the light source is emitted through the light exit plane of the light diffusion light guide member.

Thus, the prior art literature mentioned above purportedly states that a light guide plate containing scattering particles mixed therein is capable of emitting uniform light with a high light emission efficiency.

As regards the light guide plate used in the planar lighting device, there have been disclosed a light guide plate in the form of a flat plate and a light guide plate composed of a portion shaped to have a region with a tendency to grow thinner with the increasing distance from the light entrance plane attached to the other portion, in addition to the light guide plate mentioned above that is shaped to have a region with a tendency to grow thinner with the increasing distance from the light entrance plane.

However, to achieve increased dimensions with a planar lighting device using any of the light guide plates disclosed in the above prior art literature, light needs to travel a longer distance from the light source, which in turn requires the light guide plate itself to be made thicker. Thus, reducing the thickness and the weight of the planar lighting device remains a challenge to be overcome.

Further, the shape as disclosed in JP 07-36037 A, JP 08-248233 A, JP 08-271739 A, and JP 11-153963 A having a tendency to decrease in thickness with the increasing distance from a position at which light from the light source is admitted or the flat plate shape also poses a problem that a limited distance that light is capable of traveling confines the extent to which the dimensions of the planar lighting device can be increased.

Although light having a higher brightness or illuminance may be emitted by using a light source having larger light emission faces to admit a greater amount of light into the light guide plate, there is a limit to the dimensions of each light emission face of the light source that can be used depending upon the shape of the light guide plate.

The inventor of the present invention has previously proposed a planar lighting device under PCT/JP2006/316151 (International Publication WO2007/020966).

The planar lighting (illuminating) device therein disclosed comprises a first light source and a second light source disposed a given distance apart from each other and a light guide plate disposed between the first light source and the second light source, wherein the light guide plate comprises a light exit plane, a first light entrance plane facing the first light source and containing one side of the light exit plane and a second light entrance plane facing the second light source and containing the opposite side to the one side, and grows thicker from the first light entrance plane and the second light entrance plane toward a center and wherein the light guide plate contains scattering particles for scattering light entering through the first and the second light entrance planes of the light guide plate and propagating inside thereof, the scattering particles satisfying an expression (1) below:

$$1.1 \leq \Phi \cdot N_p \cdot L_G \cdot K_C \leq 8.2 \tag{1}$$

(where $\Phi$ denotes a scattering cross section of the scattering particles, $L_G$ denotes a half of a length of the light guide plate in a direction in which light is admitted, $N_p$ denotes a density of the scattering particles, and $K_C$ denotes a compensation coefficient, which is not smaller than 0.005 and not greater than 0.1).

An object of the present invention is to provide further improvements on the above planar lighting device proposed by the same inventor under PCT/JP2006/316151 and more specifically to provide a thin and lightweight planar lighting device suitably used for a large display television receiver or the like, capable of emitting illumination light free from brightness unevenness or with a reduced level of brightness unevenness, allowing increase of dimensions, and capable of optimally releasing heat generated in the light source.

The problem of heat generated in the light source needs to be addressed not only because thermal expansion to be described is thereby caused; the heat also causes decrease in the amount of light when LEDs are used as light source, and this problem also needs to be eliminated.

Accordingly, another object of the present invention in addition to the above object is to provide a planar lighting device allowing a light source having larger light emission faces to be used, capable of emitting light having a higher brightness, and eliminating the problem of an expanded light guide plate damaging the light source as the light guide plate expands in the device to protect from damage the light source such as are constituted by LEDs.

To solve the above problems, a first aspect of the present invention provides a planar lighting device comprising:
 a pair of light sources;
 a light guide plate being disposed between the pair of light sources and having a sectional shape in the form of a reversed wedge growing wider in the direction in which light beam emitted by each of the pair of light sources travels, the light guide plate including:
  a light exit plane; and
  a pair of light entrance planes, each being provided opposite each of the pair of light sources;
 a housing for accommodating the pair of light sources and the light guide plate;
 heat sinks, each for absorbing heat generated by each of the pair of light sources, and each being connected to each of the pair of light sources; and
 heat pipes, each for releasing the heat absorbed by each of the heat sinks toward the center of the housing, and each being disposed on a face of each of the heat sinks so as to extend toward the center of the housing.

Preferably, a part or the whole of a cover provided on the rear side of the housing is subjected to surface treatment to increase the surface area of the part or the whole of the cover.

The heat sinks are preferably subjected to surface treatment to increase the surface area of the heat sinks.

Surface treatment effected to the cover provided on the rear side of the housing, the heat sinks and ducts may be accomplished in a preferable manner using such methods as hairline surface treatment, sandblasting and, where aluminum is used, alumite treatment. Further, the surface state achieved by any of these treatments preferably has a surface roughness Ra of 5 µm<Ra<25 µm.

Preferably, each of the pair of light sources has LED chips and a support for supporting the LED chips, and the LED chips of each of the pair of light sources are disposed in a row on a plane of the support facing a corresponding light entrance plane of the light guide plate.

Preferably, each of the pair of light sources further comprises projections, each being higher than the height of each of the LED chips, and being provided parallel to the optical axis of light emitted by the LED chips for every one or more LED chips in the LED chips of each of the pair of light sources.

Preferably, the light guide plate further comprises recesses, each being deeper than the height of each of the LED chips, and being provided in each of the pair of light entrance planes of the light guide plate for every one or more LED chips in the LED chips of each of the pair of light sources.

Preferably, the light guide plate further comprises gap setting members, each for setting a gap higher than the height of each of the LED chips, and being provided for every one or more LED chips between each of the pair of light entrance planes of the light guide plate and the support of each of the pair of light sources.

A second aspect of the present invention provides a planar lighting device comprising:
 a pair of light sources;
 a light guide plate being disposed between the pair of light sources and having a sectional shape in the form of a reversed wedge growing wider in the direction in which light beam emitted by each of the pair of light sources travels, the light guide plate including:
  a light exit plane; and
  a pair of light entrance planes provided opposite each of the pair of light sources;
 a housing for accommodating the pair of light sources and the light guide plate;
 heat sinks, each for absorbing heat generated by each of the pair of light sources, and each being connected to each of the pair of light sources;
 first ducts, each for releasing the heat absorbed by each of the heat sinks, and each being disposed near each of the heat sinks; and
 fans, each for discharging the heat released in each of the first ducts to the outside, and each being connected to each of the first ducts.

Said heat sinks and said first ducts preferably have grooves or ridges in the direction in which said LED chips are arranged.

A third aspect of the present invention provides a planar lighting device comprising:
 a pair of light sources;
 a light guide plate being disposed between the pair of light sources and having a sectional shape in the form of a reversed wedge growing wider in the direction in which light beam emitted by each of the pair of light sources travels, the light guide plate including:
  a light exit plane; and
  a pair of light entrance planes provided opposite each of the pair of light sources;
 a housing for accommodating the pair of light sources and the light guide plate;

a power supply casing mounted on the underside of the housing;

a second duct for releasing heat generated by said pair of light sources from said underside of said housing as well as heat generated by said power supply casing, the second duct being provided between said underside of said housing and said power supply casing, the second duct also serving as a separation wall; and exhaust means for discharging the heat released in the second duct to the outside, the exhaust means being provided in the second duct close to the central area of the housing.

Further, the exhaust means preferably comprises a fan.

Preferably, the light guide plate further comprises:

a power supply casing mounted on the underside of the housing;

a second duct for releasing heat generated by said pair of light sources from said underside of said housing as well as heat generated by said power supply casing, the second duct being provided between said underside of said housing and said power supply casing, the second duct also serving as a separation wall; and exhaust means for discharging the heat released in the second duct to the outside, the exhaust means being provided in the second duct close to the central area of the housing.

Preferably, the light guide plate contains numerous scattering particles therein, the scattering particles satisfying an inequality:

$$1.1 \leq \Phi \cdot N_p \cdot L_G \cdot K_C \leq 8.2$$

$$0.005 \leq K_C \leq 0.1$$

where $\Phi$ denotes a scattering cross section of the scattering particles, $N_p$ denotes a density of the scattering particles, $K_C$ denotes a compensation coefficient, and $L_G$ denotes the length of the light guide plate in a direction in which light is admitted from the light entrance plane to a position where the light guide plate is thickest.

Preferably, the light exit plane of the light guide plate is rectangular and the light entrance plane is composed of a first light entrance plane and a second light entrance plane formed on two opposite sides of the light exit plane, the rear plane opposite the light exit plane being closest to the light exit plane at the first light entrance plane and the second light entrance plane and farthest from the light exit plane at the midpoint of a line connecting the first light entrance plane and the second light entrance plane.

According to the present invention, the above configurations enable efficient use of light emitted by the light sources and emission of light free from brightness unevenness or with a reduced level of brightness unevenness through the light exit plane. Further, the present invention provides a planar lighting device that allows reduction of weight and thickness of the device and increase in dimensions of the light exit plane as well as an optimum dissipation of heat generated in the light sources.

In that process, the heat generated in the light sources can be efficiently discharged to the outside by means of heat pumps or by provision of ducts. Further, laminar air flow may be produced by providing grooves or ridges along the passage of air flow, leading to an increased flow rate and, hence, an efficient heat dissipation.

Where a duct, which also acts as a separation wall, is provided between the underside of the housing and the power supply casing that contains a control circuit board, the heat generated in the circuit board does not reach the light sources and, conversely, the heat generated in the light sources does not reach the circuit board, thus preventing decrease in light emission efficiency of the LEDs of the light sources and occurrence of an out-of-control operation of the circuit that might otherwise be caused by heat accumulation in the circuit board.

Where a projection or an abutment higher than the LED chips is provided for every one or more LED chips of the light sources parallel to the optical axis of the light emitted by the LED chips, or where a recess deeper than the height of the LED chips are provided in the light entrance planes of the light guide plate for every one or more LED chips of the light sources, the possibility of light entrance planes of the light guide plate coming into a direct contact with the LED chips or pressing the LED chips is precluded and thus damage of the LED chips can be prevented, should the temperature of the periphery of the light sources rise, deforming part of the light guide plate close to the light sources and causing the deformed part to produce a pressure toward the LED chips.

BRIEF DESCRIPTION OF THE DRAWINGS

These and other objects, features, and advantages of the present invention will be apparent from the following detailed description and accompanying drawings in which:

FIGS. 9A and 9C are top plan views; FIGS. 9B and 9D are elevations.

FIGS. 10A and 10B schematically illustrate a first example having a structure whereby damage of the LEDs due to the expansion of the light guide plate is prevented. FIG. 10A is a top plan view; FIG. 10B is an elevation of the light source.

FIG. 11A is an enlarged view of FIG. 10A and FIGS. 11B to 11D are elevations illustrating shapes of members used in other examples.

FIG. 12 is a top plan view schematically illustrating a second example having a structure whereby damage of the LEDs due to the expansion of the light guide plate is prevented.

FIGS. 15A to 15C illustrate a first example of the structure encouraging dissipation of heat generated by the LEDs. FIG. 15A is a top plan view, FIG. 15B is an elevation taken along line C-C of FIG. 15A, and FIG. 15C is an elevation as seen from the right-hand side of FIG. 15B.

FIGS. 16A to 16C illustrate a second example of the structure encouraging dissipation of heat generated by the LEDs. FIG. 16A is a top plan view, FIG. 16B is an elevation taken along line D-D of FIG. 16A, and FIG. 16C is an elevation as seen from the right-hand side of FIG. 16B.

FIGS. 18A and 18B illustrate a fourth example of the structure encouraging dissipation of heat generated by the LEDs. FIG. 18A is a bottom view; FIG. 18B is an elevation as seen from the right-hand side of FIG. 18A.

FIG. 19A is a bottom view; FIG. 19B is an elevation as seen from the right-hand side of FIG. 19A.

FIG. 20A is a top plan view, FIG. 20B is a schematic sectional view illustrating the whole configuration, and FIGS. 20C and 20D are partially enlarged sectional views.

The planar lighting device of the invention will be described in detail below referring to an embodiment illustrated in the accompanying drawings. First, the basic configuration of the planar lighting device will be described.

Figure 1:
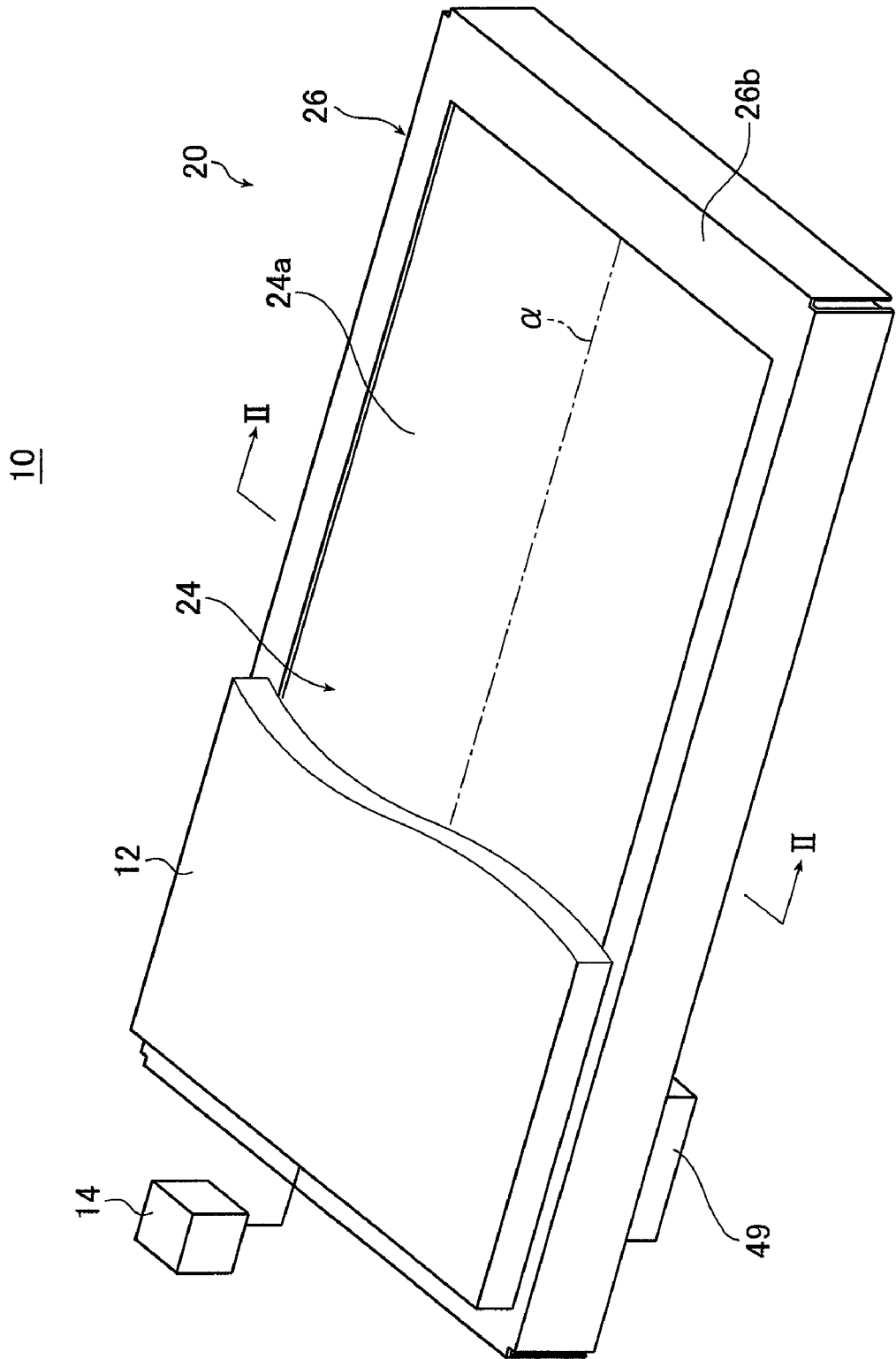
FIG. 1 is a schematic perspective view illustrating an embodiment of a liquid crystal display device using the planar lighting device of the invention.
Figure 2:
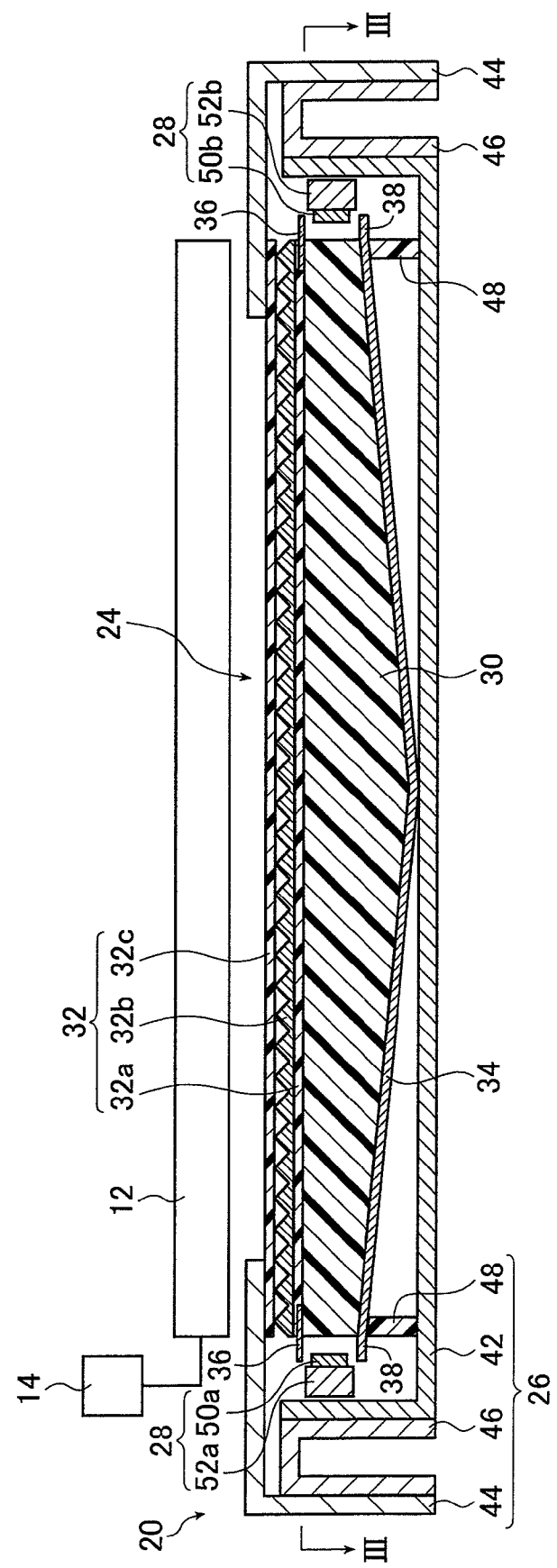
FIG. 2 is a cross sectional view of the liquid crystal display device illustrated in FIG. 1 taken along line II-II.

FIG. 1 is a schematic perspective view illustrating a liquid crystal display device provided with the planar lighting device of the invention; FIG. 2 is a cross sectional view of the liquid crystal display device illustrated in FIG. 1 taken along line II-II.

Figure 3A:
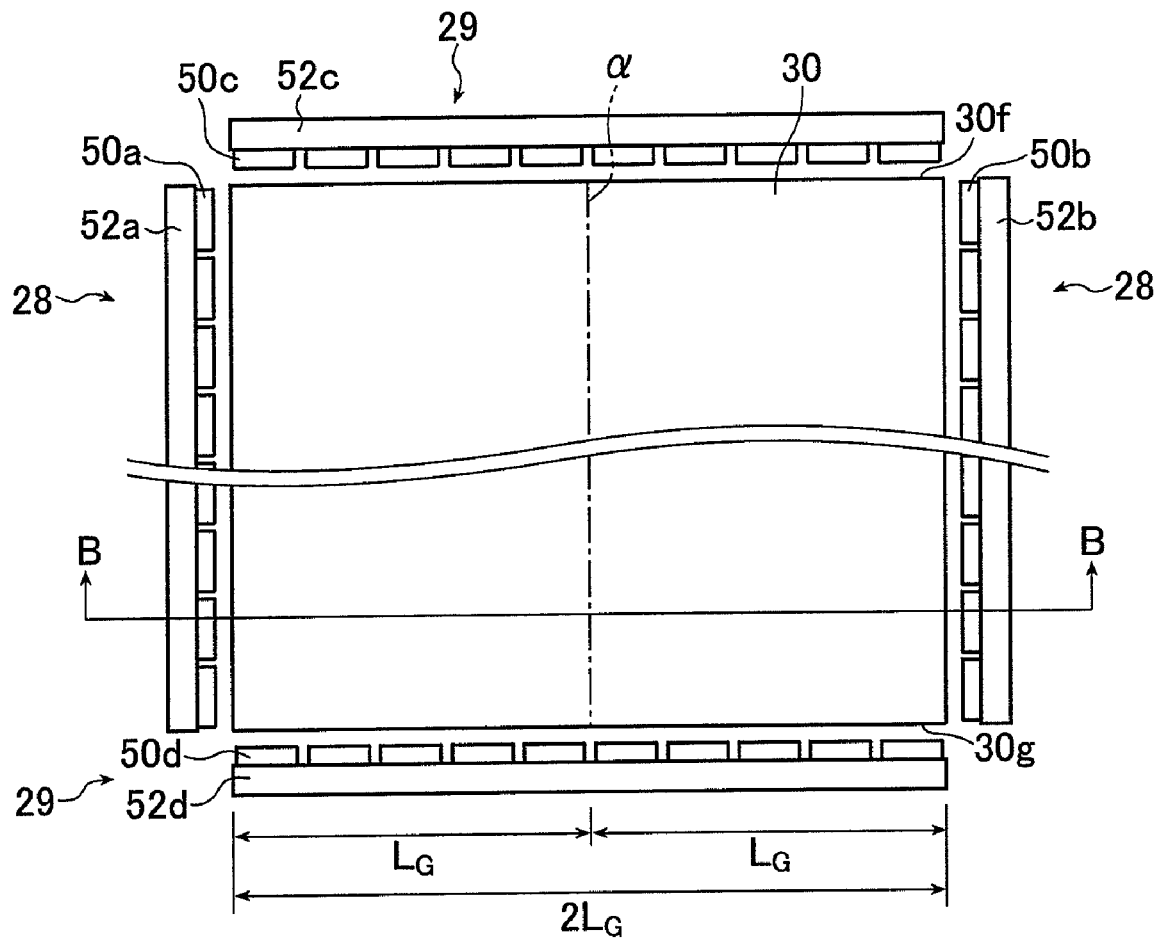
FIG. 3A is a view of an example of the planar lighting device illustrated in FIG. 2 taken along line III-III.
Figure 3B:
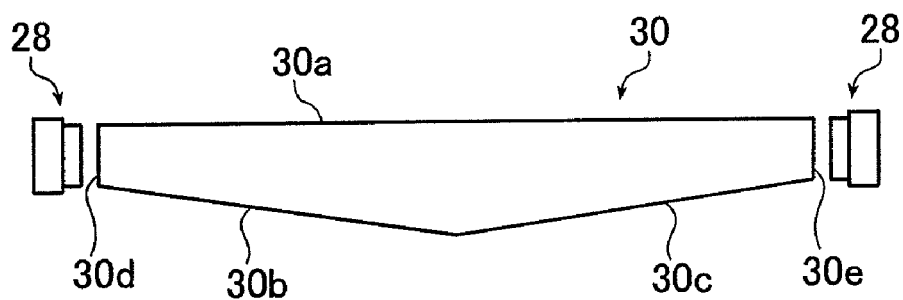
FIG. 3B is a cross sectional view of FIG. 3A taken along line B-B.

FIG. 3A is a view of the planar lighting device (also referred to as "backlight unit" below) illustrated in FIG. 2 taken along line III-III; FIG. 3B is a cross sectional view of FIG. 3A taken along line B-B.

FIG. 3 illustrates a planar lighting device provided with a backlight unit 20 admitting light through the four lateral sides thereof.

A liquid crystal display device 10 comprises a backlight unit 20, a liquid crystal display panel 12 disposed on the side of the backlight unit closer to the light exit plane, and a drive unit 14 for driving the liquid crystal display panel 12. In FIG. 1, part of the liquid crystal display panel 12 is not shown to better illustrate the configuration of the planar lighting device.

In the liquid crystal display panel 12, electric field is partially applied to liquid crystal molecules, previously arranged in a given direction, to change the orientation of the molecules. The resultant changes in refractive index in the liquid crystal cells are used to display characters, figures, images, etc., on the liquid crystal display panel 12.

The drive unit 14 applies a voltage to transparent electrodes in the liquid crystal display panel 12 to change the orientation of the liquid crystal molecules, thereby controlling the transmittance of the light transmitted through the liquid crystal display panel 12.

The backlight unit 20 is a lighting device for illuminating the whole surface of the liquid crystal display panel 12 from behind the liquid crystal display panel 12 and comprises a light exit plane having substantially a same shape as an image display surface of the liquid crystal display panel 12.

As illustrated in FIGS. 1, 2, 3A and 3B, the first example of the backlight unit 20 comprises a main body of the lighting device 24 and a housing 26. The main body of the lighting device 24 comprises two main light sources 28, two auxiliary light sources 29, a light guide plate 30, an optical member unit 32, and a reflection plate 34. The housing 26 comprises a lower housing 42, an upper housing 44, turnup members 46, and support members 48. As illustrated in FIG. 1, a power unit casing 49 is provided on the underside of the lower housing 42 of the housing 26 to hold power supply units that supply the main light sources 28 and the auxiliary light sources 29 with electrical power.

Now, components that make up the backlight unit 20 will be described.

The main body of the lighting device 24 comprises the main light sources 28 and the auxiliary light sources 29 for emitting light, the light guide plate 30 for admitting the light emitted by the main light sources 28 and the auxiliary light sources 29 to produce planar light, and the optical member unit 32 for scattering and diffusing the light produced by the light guide plate 30 to obtain light with further reduced unevenness.

First, the main light sources 28 and the auxiliary light sources 29 will be described.

The main light sources 28 and the auxiliary light sources 29 basically have the same configuration except the position with respect to the light guide plate 30. Therefore, only the main light sources 28 will be described as representative.

Figure 4A:
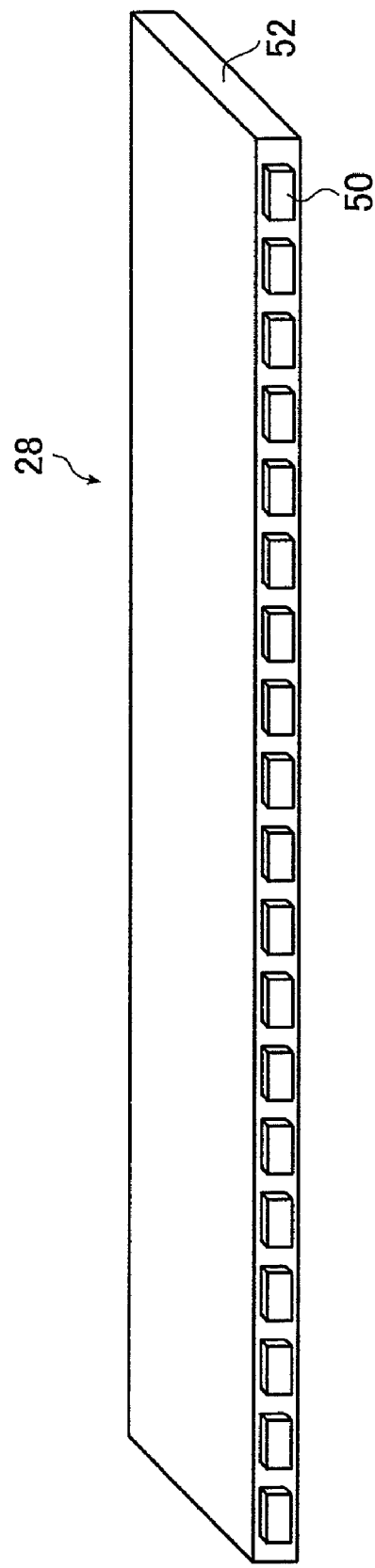
FIG. 4A is a perspective view schematically illustrating a configuration of the light source used in the planar lighting device of FIGS. 1 and 2.
Figure 4C:
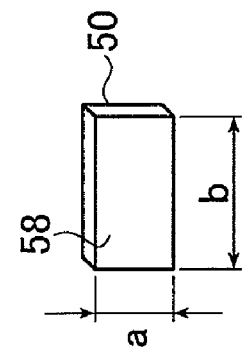
FIG. 4C is a schematic perspective view illustrating one LED of the light source of FIG. 4A as enlarged.
Figure 4B:
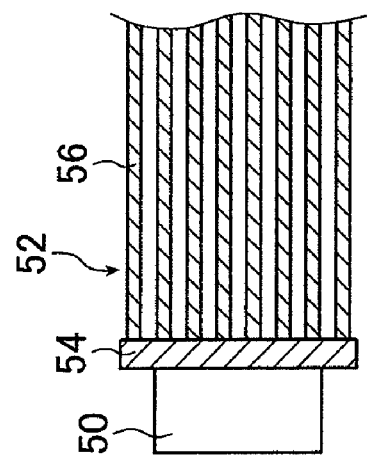
FIG. 4B is a cross sectional view of the light source illustrated in FIG. 4A.

FIG. 4A is a perspective view schematically illustrating a configuration of the main light sources 28 of the planar lighting device 20 of FIGS. 1 and 2; FIG. 4B is a cross sectional view of the main light source 28 illustrated in FIG. 4A; and FIG. 4C is a schematic perspective view illustrating only one LED of the main light source 28 of FIG. 4A as enlarged.

As illustrated in FIG. 4A, the main light source 28 comprises light emitting diode chips (referred to as "LED chips" below) 50 and a light source mount 52.

The LED chip 50 is a chip of a light emitting diode emitting blue light the surface of which has a fluorescent substance applied thereon. It has a light emission face 58 with a given area through which white light is emitted.

Specifically, when blue light emitted through the surface of light emitting diode of the LED chip 50 is transmitted through the fluorescent substance, the fluorescent substance generates fluorescence. Thus, when blue light emitted by the LED chip 50 is transmitted through the fluorescent substance, the blue light emitted by the light emitting diode and the light radiated as the fluorescent substance generates fluorescence blend to produce and emit white light.

The LED chip 50 may for example be formed by applying a YAG (yttrium aluminum garnet) base fluorescent substance to the surface of a GaN base light emitting diode, an InGaN base light emitting diode, etc.

As illustrated in FIG. 4B, the light source mount 52 comprises an array base 54 and fins 56. The LED chips 50 described above are arranged in a single row on the array base 54 at given intervals. Specifically, the LED chips 50 constituting the main light sources 28 are arrayed and secured to the array base 54 along the length of a first light entrance plane 30d or a second light entrance plane 30e of a light guide plate 30 to be described, that is, parallel to a line in which a light exit plane 30a meets with the first light entrance plane 30d or parallel to a line in which the light exit plane 30a meets with the second light entrance plane 30e.

The array base 54 is a plate member disposed such that one surface thereof faces the thinnest lateral end face of the light guide plate 30, i.e., the first light entrance plane 30d or the second light entrance plane 30e of the light guide plate 30. The LED chips 50 are carried on a lateral plane of the array base 54 facing the light entrance plane 30b of the light guide plate 30.

The array base 54 according to the embodiment under discussion is formed of a metal having a good heat conductance as exemplified by copper and aluminum. The array base 54 also acts as a heat sink to absorb heat generated by the LED chips 50 and releases the heat to the outside. Since the heat absorbed by the array base 54 is transferred to the fins 56, which dissipate the heat to the outside, the light sources 52 each having the array base 54 and the fins 56 of course function as heat sink.

The fins 56 are plate members each formed of a metal having a good heat conductance as exemplified by copper and aluminum. The fins 56 are connected to the array base 54 on the side thereof opposite from the LED chips 50 and spaced a given distance from neighboring fins 56.

A plurality of fins 56 provided in the light source mount 52 ensure a large surface area and a high heat dissipation efficiency, increasing the efficiency with which the LED chips 50 are cooled.

The heat sink that absorbs the heat generated by the LED chips 50 is not limited to the air-cooled type having the fins 56 like the light source mount 52 as illustrated and may be of water-cooled type cooling the array base 54 with water.

While the embodiment under discussion uses the array base 54 of the light source mount 52 and the fins 56 as heat sink, a separately provided heat sink may be connected to the array base 54 to encourage heat dissipation. Where the LED chips need not be cooled, a plate member without a heat-releasing function may be used to form the array base in place of the array base having a function of a heat sink.

As illustrated in FIG. 4C, the LED chips 50 of the embodiment under discussion each have a rectangular shape such that the sides perpendicular to the direction in which the LED chips 50 are arrayed are shorter than the sides lying in the direction in which the LED chips 50 are arrayed or, in other words, the sides lying in the direction of thickness of the light guide plate 30 to be described, i.e., the direction perpendicular to the light exit plane 30a, are the shorter sides. Expressed otherwise, the LED chips 50 each have a shape defined by b>a where "a" denotes the length of the sides perpendicular to the light exit plane 30a of the light guide plate 30 and "b" denotes the length of the sides in the array direction. Now, let "q" be the distance by which the arrayed LED chips 50 are spaced apart from each other, then q>b holds. Thus, the length "a" of the sides of the LED chips 50 perpendicular to the light exit plane 30a of the light guide plate 30, the length "b" of the sides in the array direction, and the distance "q" by which the arrayed LED chips 50 are spaced apart from each other preferably have a relationship satisfying q>b>a.

Providing the LED chips 50 each having the shape of a rectangle allows a thinner design of the light source to be achieved while producing a large amount of light. A thinner light source, in turn, enables a thinner design of the planar lighting device to be achieved. Further, the number of LED chips that need to be arranged may be reduced.

While the LED chips 50 each preferably have a rectangular shape with the shorter sides lying in the direction of the thickness of the light guide plate 30 for a thinner design of the light source, the present invention is not limited thereto, allowing the LED chips to have any shape as appropriate such as a square, a circle, a polygon, and an ellipse.

While the LED chips, arranged in a single row, has a monolayered structure in the embodiment under discussion, the present invention is not limited thereto; one may use multilayered LED arrays for the light source consisting of the array base 54 each carrying LED chips 50. Where the LED arrays are thus stacked, more LED arrays can be stacked when the LED chips 50 are each adapted to have a rectangular shape and when the LED arrays are each adapted to have a reduced thickness. Where the LED arrays are stacked to form a multilayer structure, that is to say, where more LED arrays (LED chips) are packed into a given space, a large amount of light can be generated. Preferably, the above expression also applies to the distance separating the LED chips of an LED array from the LED chips of the LED arrays in adjacent layers. Expressed otherwise, the LED arrays preferably are stacked such that the LED chips are spaced a given distance apart from the LED chips of the LED arrays in adjacent layers.

Now, the light guide plate 30 will be described.

Figure 5:
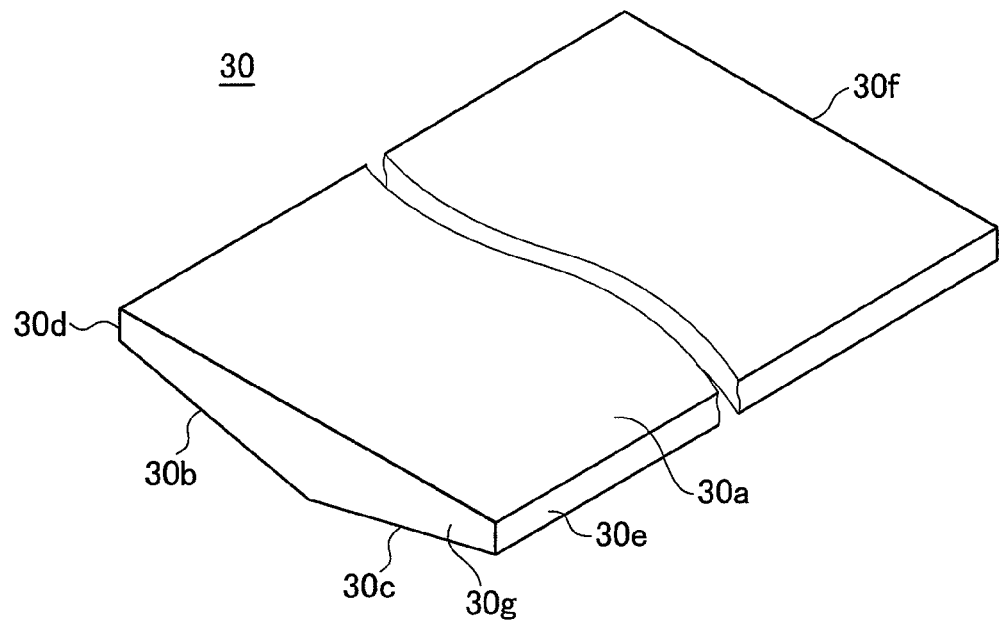
FIG. 5 is a schematic perspective view illustrating a shape of the inventive light guide plate.

FIG. 5 is a perspective view schematically illustrating the configuration of the light guide plate 30.

As illustrated in FIGS. 2, 3, and 5, the light guide plate 30 comprises the light exit plane 30a, which is flat and substantially rectangular; two light entrance planes, the first light entrance plane 30d and the second light entrance plane 30e, formed on both sides of the light exit plane 30a and substantially perpendicular to the light exit plane 30a; two inclined planes, a first inclined plane 30b and a second inclined plane 30c, located on the opposite side from the light exit plane 30a, i.e., on the underside of the light guide plate so as to be symmetrical to each other with respect to a central axis, or the bisector α bisecting the light exit plane 30a (see FIGS. 1 and 3) in a direction parallel to the first light entrance plane 30d and the second light entrance plane 30e, and inclined a given angle with respect to the light exit plane 30a; and two lateral planes, a first lateral plane 30f and a second lateral plane 30g, formed substantially vertical to the light exit plane 30a on the sides of the light exit plane 30a on which the light entrance planes are not formed, i.e., on the two sides perpendicular to the sides where the light exit plane 30a and the light entrance planes meet.

The first inclined plane 30b and the second inclined plane 30c are so inclined as to be distanced farther from the light exit plane 30a with the increasing distance from the first light entrance plane 30d and the second light entrance plane 30e, respectively: expressed otherwise, the thickness of the light guide plate 30 in the direction perpendicular to the light exit plane 30a increases from the first light entrance plane 30d and the second light entrance plane 30e toward the center of the light guide plate 30.

Thus, the light guide plate 30 is thinnest at both sides thereof, i.e., at the first light entrance plane 30d and the second light entrance plane 30e, and thickest at the center, i.e., on the bisector α, where the first inclined plane 30b and the second inclined plane 30c meet. Expressed otherwise, the light guide plate 30 has such a configuration that the thickness of the light guide plate 30 in the direction perpendicular to the light exit plane 30a increases with the increasing distance from the first light entrance plane 30d or the second light entrance plane 30e. The inclination angle of the first inclined plane 30b and the second inclined plane 30c with respect to the light exit plane 30a is not specifically limited.

The two main light sources 28 mentioned above are disposed opposite the first light entrance plane 30d and the second light entrance plane 30e of the light guide plate 30, respectively. Specifically, one of the main light sources 28 comprising LED chips 50a and a light source mount 52a is disposed opposite the first light entrance plane 30d and the other main light source 28 comprising LED chips 50b and a light source mount 52b is disposed opposite the second light entrance plane 30e. In the embodiment under discussion, the light emission face 58 of the LED chips 50 of the light sources 28 has substantially the same length as the first light entrance plane 30d and the second light entrance plane 30e in the direction perpendicular to the light exit plane 30a.

Thus, the planar lighting device 20 has the two major light sources 28 disposed in such a manner as to sandwich the light guide plate 30. In other words, the light guide plate 30 is placed between the two major light sources 28 arranged opposite each other with a given distance between them.

Further, the above-mentioned two auxiliary light sources 29 are each disposed opposite the first lateral plane 30f and the second lateral plane 30g. Specifically, one of the auxiliary light sources 29 configured by LED chips 50c and a light source mount 52c is disposed opposite the first lateral plane 30f and the other auxiliary light source 29 configured by LED chips 50d and a light source mount 52d is disposed opposite the second lateral plane 30g.

In the light guide plate 30 illustrated in FIG. 2, light entering the light guide plate 30 through the first light entrance plane 30d and the second light entrance plane 30e is scattered as it travels through the inside of the light guide plate 30 by scatterers contained inside the light guide plate 30 as will be described later in detail and, directly or after being reflected by the first inclined plane 30b or the second inclined plane 30c, exits through the light exit plane 30a. Some light can in the process leak through the first inclined plane 30b and the second inclined plane 30c. However, it is then reflected by the reflection plate 34 provided on the side of the light guide plate closer to the first inclined plane 30b and the second inclined plane 30c to enter the light guide plate 30 again. The reflection plate 34 will be described later in detail.

Likewise, the light emitted by the auxiliary light sources 29 and admitted through the first lateral plane 30f and the second lateral plane 30g is scattered as it travels through the inside of the light guide plate 30 by scatterers contained inside the light guide plate 30 as will be described later in detail and, directly or after being reflected by the first inclined plane 30b or the second inclined plane 30c, exits through the light exit plane 30a.

The shape of the light guide plate thus growing thicker in the direction perpendicular to the light exit plane 30a with the increasing distance from the first light entrance plane 30d or the second light entrance plane 30e opposite which the main light source 28 is disposed allows the light admitted through the light entrance planes to travel farther from the light entrance planes and, hence, enables a larger light exit plane to be achieved. Moreover, since the light entering through the light entrance plane is advantageously guided to travel a long distance from the light entrance plane, a thinner design of the light guide plate is made possible.

The light guide plate 30 is formed of a transparent resin into which scattering particles are kneaded and dispersed. Transparent resin materials that may be used to form the light guide plate 30 include optically transparent resins such as PET (polyethylene terephthalate), PP (polypropylene), PC (polycarbonate), PMMA (polymethyl methacrylate), benzyl methacrylate, MS resins, and COP (cycloolefin polymer). The scattering particles kneaded and dispersed into the light guide plate 30 may be formed, for example, of TOSPEARL (trademark), silicone, silica, zirconia, or a derivative polymer. The light guide plate 30 containing the scattering particles is capable of emitting uniform illumination light through the light exit plane with a greatly reduced level of brightness unevenness. The light guide plate 30 so formed may be manufactured using an extrusion molding method or an injection molding method.

Now, let $\Phi$ be the scattering cross section of scattering particles contained in the light guide plate 30; $L_G$ the length in the incident direction from the first light entrance plane 30d or the second light entrance plane 30e of the light guide plate 30 to a position where the thickness of the light guide plate 30 in the direction perpendicular to the light exit plane 30a is greatest, said incident direction, expressed otherwise, being the direction parallel to the direction in which light entering the light guide plate travels and perpendicular to the line in which the light exit plane and the light entrance planes, i.e., the first light entrance plane and the second light entrance plane, meet, said length $L_G$ being, in the embodiment under discussion, a half of the length of the light guide plate in the incident direction, which in the embodiment under discussion is the direction perpendicular to the first light entrance plane 30d of the light guide plate 30, as also referred to as "direction of the optical axis" below, or, still otherwise expressed, the length from the first light entrance plane or the second light entrance plane to the bisector $\alpha$; $N_p$ the density of the scattering particles contained in the light guide plate 30, said density denoting the number of particles in unit volume; and $K_C$ a compensation coefficient. Then the value $\Phi \cdot N_p \cdot L_G \cdot K_C$ is preferably not less than 1.1 and not greater than 8.2; the compensation coefficient $K_C$ is preferably not less than 0.005 and not greater than 0.1. The light guide plate 30, containing scattering particles satisfying the above relationship, is capable of emitting uniform illumination light through the light exit plane 30a with a greatly reduced level of brightness unevenness.

When parallel rays of light are caused to enter an isotropic medium, a transmittance T is generally expressed according to the Lambert-Beer law by the following expression (1):

$$T=I/I_o=\exp(-\rho \cdot x) \tag{1}$$

where x is a distance, $I_o$ an intensity of incident light, I an intensity of outgoing light, and $\rho$ an attenuation constant.

The above attenuation constant $\rho$ can be expressed using the scattering cross section of particles $\Phi$ and the number of particles $N_p$ in unit volume contained in the medium as follows:

$$\rho=\Phi \cdot N_p \tag{2}$$

Accordingly, the light extraction efficiency $E_{out}$ is expressed by the following expression (3) where $L_G$ is the length of the light guide plate in the direction parallel to the direction in which light entering the light guide plate travels from the light entrance planes of the light guide plate as far as the thickest position or, in the embodiment under discussion, a half of the length of the light guide plate in the direction of the optical axis. Said half of the length of the light guide plate in the direction of the optical axis denoted by $L_G$ is the length of the light guide plate 30 in the direction perpendicular to the light entrance planes of the light guide plate 30 from one of the light entrance planes of the light guide plate 30 to the center of the light guide plate 30.

The light extraction efficiency $E_{out}$ is a ratio of light reaching the position spaced apart from the light entrance plane of the light guide plate by the length $L_G$ in the direction of the optical axis to the incident light. In the case of the light guide plate 30 illustrated in FIG. 2, for example, the light extraction efficiency $E_{out}$ is a ratio of light reaching the center of the light guide plate or, light traveling half the length of the light guide plate in the direction of the optical axis to the light incident on either end plane.

$$E_{out} \propto \exp(-\Phi \cdot N_p \cdot L_G) \tag{3}$$

The expression (3) applies to a space of limited dimensions. Introducing the compensation coefficient $K_C$ therein to correct the relationship with the expression (1), the light extraction efficiency $E_{out}$ is expressed by the following expression (4). The compensation coefficient $K_C$ is a dimensionless compensation coefficient empirically obtained where light propagates through an optical medium of limited dimensions.

$$E_{out}=\exp(-\Phi \cdot N_p \cdot L_G \cdot K_C) \quad (4)$$

According to the expression (4), when $\Phi \cdot N_p \cdot L_G \cdot K_C$ is 3.5, the light extraction efficiency $E_{out}$ is 3%. When $\Phi \cdot N_p \cdot L_G \cdot K_C$ is 4.7, the light extraction efficiency $E_{out}$ is 1%.

The results show that the light extraction efficiency $E_{out}$ decreases as $\Phi \cdot N_p \cdot L_G \cdot K_C$ increases. The light extraction efficiency $E_{out}$ decreases in such a manner presumably because light is scattered increasingly as it travels in the direction of the optical axis of the light guide plate.

It follows, therefore, that the greater the value $\Phi \cdot N_p \cdot L_G \cdot K_C$ is, the more preferable it is as a property for the light guide plate. When $\Phi \cdot N_p \cdot L_G \cdot K_C$ is great, light exiting through a plane opposite the light entrance plane can be reduced whereas light emitted through the light exit plane can be increased. Expressed otherwise, when $\Phi \cdot N_p \cdot L_G \cdot K_C$ is great, the ratio of light emitted through the light exit plane to the light incident on the light entrance planes can be increased. That ratio is also referred to as "light use efficiency" below. Specifically, a light use efficiency as high as 50% or more is achieved when $\Phi \cdot N_p \cdot L_G \cdot K_C$ is 1.1 or greater.

While light emitted through the light exit plane 30a of the light guide plate 30 increasingly exhibits illuminance unevenness as $\Phi \cdot N_p \cdot L_G \cdot K_C$ increases, the illuminance unevenness can be held to under a given, tolerable level by holding the value $\Phi \cdot N_p \cdot L_G \cdot K_C$ to 8.2 or less. Note that illuminance and brightness can be treated substantially equally. Thus, it is assumed that brightness and illuminance possess similar tendencies in the present invention.

Thus, the value $\Phi \cdot N_p \cdot L_G \cdot K_C$ of the inventive light guide plate 30 is preferably not less than 1.1 and not greater than 8.2, and more preferably not less than 2.0 and not greater than 8.0. Still more preferably, the value $\Phi \cdot N_p \cdot L_G \cdot K_C$ is not less than 3.0 and, most preferably, not less than 4.7.

The compensation coefficient $K_C$ is preferably not less than 0.005 and not greater than 0.1, thus $0.005 \leq K_C \leq 0.1$.

Now, the light guide plate 30 will be described in greater detail by referring to specific examples.

A computer simulation was conducted to obtain light use efficiencies for different light guide plates given different values of $\Phi \cdot N_p \cdot L_G \cdot K_C$ by varying the scattering cross section $\Phi$, the particle density $N_p$, the length $L_G$, which is a half of the length of the light guide plate in the direction of the optical axis, and the compensation coefficient $K_C$. Further, illuminance unevenness was evaluated. The illuminance unevenness (%) was defined as $[(I_{Max}-I_{Min})/I_{Ave}] \times 100$, where $I_{Max}$ was a maximum illuminance of light emitted through the light exit plane of the light guide plate, $I_{Min}$ a minimum illuminance, and $I_{Ave}$ an average illuminance.

The measurement results are shown in Table 1. In Table 1, judgments "O" indicate cases where the light use efficiency is 50% or more and the illuminance unevenness is 150% or less whereas judgments "X" indicate cases where the light use efficiency is less than 50% or the illuminance unevenness is more than 150%.

TABLE 1

|  | $\Phi$ [m$^2$] | $N_p$ [pcs/m$^3$] | $L_G$ [m] | $K_C$ | $\Phi \cdot N_p \cdot L_G \cdot K_C$ | Light use efficiency [%] | Illuminance unevenness [%] | Judgment |
| --- | --- | --- | --- | --- | --- | --- | --- | --- |
| Example 1 | $2.0 \times 10^{-12}$ | $2.2 \times 10^{14}$ | 0.3 | 0.03 | 3.51 | 81.6 | 84 | O |
| Example 2 | $2.0 \times 10^{-12}$ | $4.3 \times 10^{14}$ | 0.3 | 0.02 | 6.21 | 84.7 | 149 | O |
| Example 3 | $2.0 \times 10^{-12}$ | $8.6 \times 10^{14}$ | 0.1 | 0.02 | 3.86 | 82.8 | 82 | O |
| Example 4 | $1.1 \times 10^{-10}$ | $1.5 \times 10^{13}$ | 0.3 | 0.008 | 3.91 | 83.0 | 105 | O |
| Example 5 | $1.1 \times 10^{-10}$ | $2.0 \times 10^{13}$ | 0.3 | 0.007 | 4.98 | 84.3 | 142 | O |
| Example 6 | $1.1 \times 10^{-10}$ | $3.5 \times 10^{13}$ | 0.1 | 0.007 | 2.86 | 79.2 | 47 | O |
| Comparative example 1 | $2.0 \times 10^{-12}$ | $2.2 \times 10^{13}$ | 0.3 | 0.05 | 0.66 | 29.1 | 51 | X |
| Comparative example 2 | $1.1 \times 10^{-12}$ | $2.5 \times 10^{12}$ | 0.3 | 0.01 | 0.99 | 43.4 | 59 | X |
| Comparative example 3 | $4.8 \times 10^{-18}$ | $8.6 \times 10^{17}$ | 0.1 | 15.2 | 6.26 | 84.8 | 201 | X |
| Comparative example 4 | $4.8 \times 10^{-18}$ | $1.7 \times 10^{18}$ | 0.1 | 13.9 | 11.5 | 84.9 | 225 | X |

Figure 6:
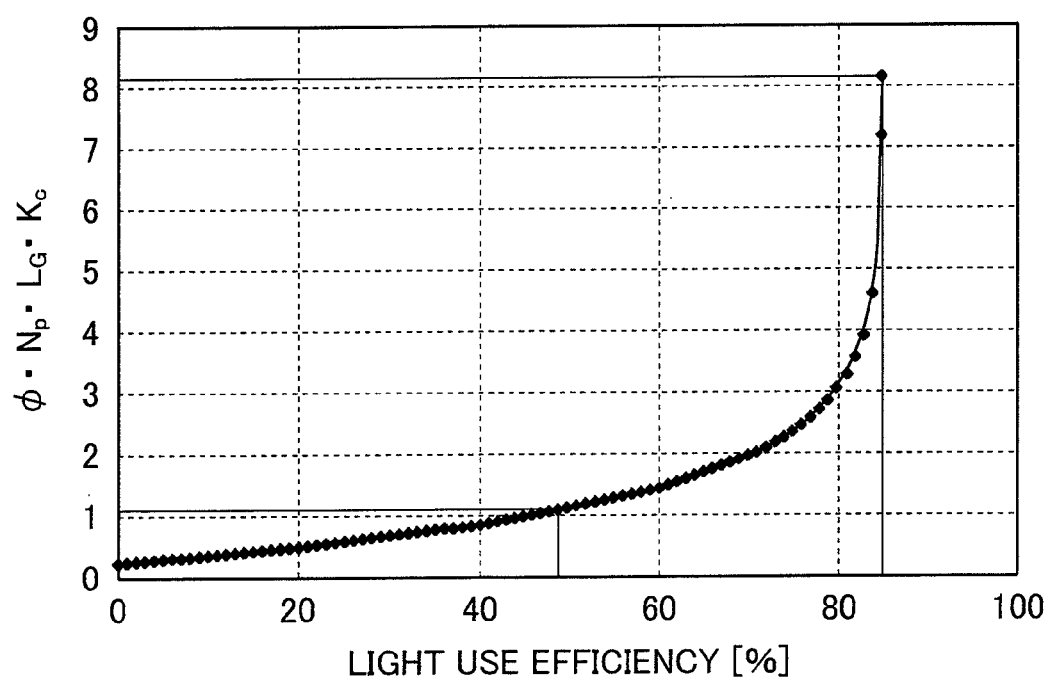
FIG. 6 is a graph illustrating measurements representing a relationship between $\Phi \cdot N_p \cdot L_G \cdot K_C$ and light use efficiency.

FIG. 6 illustrates a relationship between $\Phi \cdot N_p \cdot L_G \cdot K_C$ and light use efficiency, i.e., the ratio of light emitted through the light exit plane 30a to light incident on the light entrance planes.

Table 1 and FIG. 6 show that given $\Phi \cdot N_p \cdot L_G \cdot K_C$ of 1.1 or more, a high light use efficiency, specifically 50% or more, is achieved whereas given $\Phi \cdot N_p \cdot L_G \cdot K_C$ of 8.2 or less, illuminance unevenness can be held to 150% or less.

It is also shown that given $K_C$ of 0.005 or more, a high light use efficiency is achieved, and given $K_C$ of 0.1 or less, illuminance unevenness observed in light emitted from the light guide plate can be reduced to a low level.

Next, light guide plates varying in particle density $N_p$ of the particles kneaded or dispersed therein were fabricated to measure brightness distributions of light emitted at different positions in the light exit plane of the individual light guide plates. In the embodiment under discussion, the conditions including scattering cross section $\Phi$, length $L_G$, which is a half of the length of the light guide plate in the direction of its optical axis, compensation coefficient $K_C$, and shape of the light guide plate, but excluding particle density $N_p$, were respectively set to fixed values as the measurements were made. In the embodiment under discussion, therefore, the value $\Phi \cdot N_p \cdot L_G \cdot K_C$ changes in proportion as the particle density $N_p$ changes.

Figure 7:
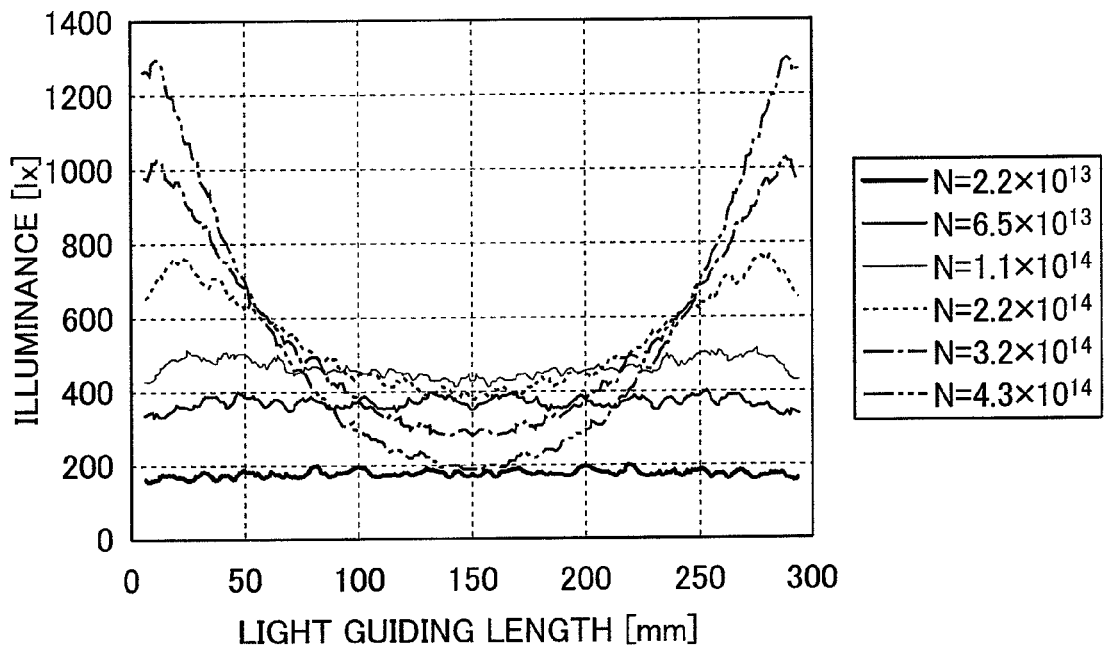
FIG. 7 is a graph illustrating measurements representing illuminances of light emitted by light guide plates each having different particle densities.

FIG. 7 shows the measurements of the distribution of illuminance observed in the light emitted through the light exit plane of the individual light guide plates having different particle densities. FIG. 7 shows the illuminance [lx] on the vertical axis plotted against a light guiding length, which is the distance [mm] from one of the light entrance planes of the light guide plate on the horizontal axis.

Illuminance unevenness was calculated from $[(I_{Max}-I_{Min})/I_{Ave}] \times 100[\%]$, where $I_{Max}$ is a maximum illuminance in the measured distribution of light emitted from areas of the light exit plane close to the lateral ends thereof, $I_{Min}$ is a minimum illuminance, and $I_{Ave}$ is an average illuminance.

Figure 8:
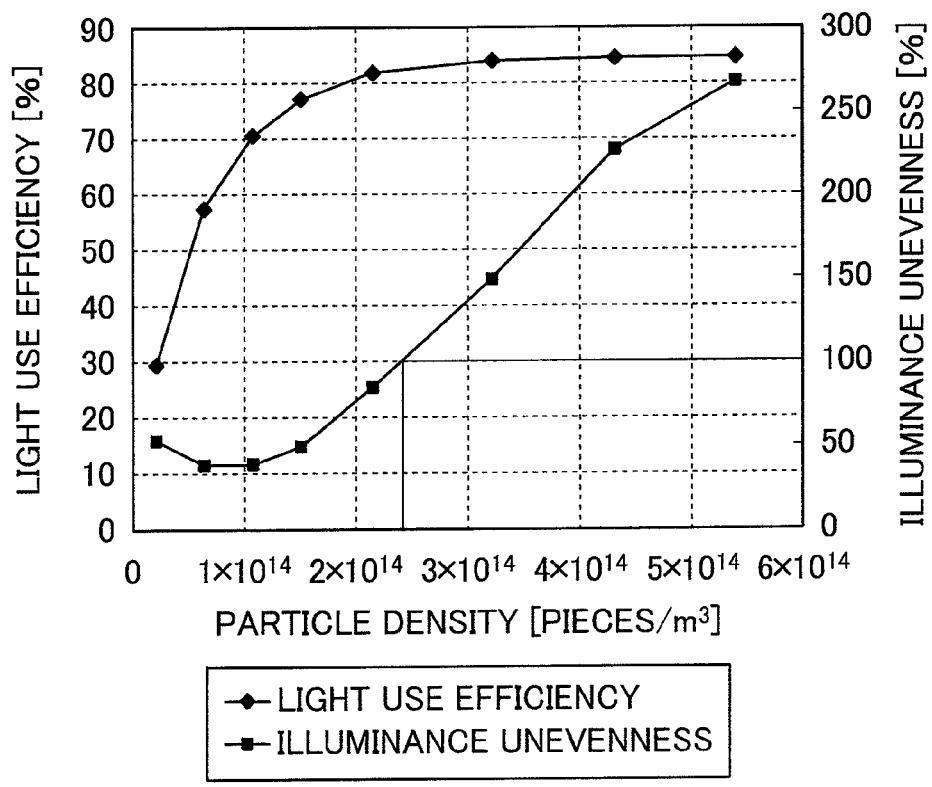
FIG. 8 is a graph illustrating relationships between light use efficiency and illuminance unevenness on the one hand and particle density on the other.

FIG. 8 illustrates a relationship between the calculated illuminance unevenness and particle density. FIG. 8 shows the illuminance unevenness [%] on the vertical axis plotted against the particle density [pieces/m³] on the horizontal axis. Also shown in FIG. 8 is a relationship between light use efficiency and particle density, the particle density being likewise indicated on the horizontal axis and the light use efficiency [%] on the vertical axis.

As shown in FIGS. 7 and 8, increasing the particle density or, consequently, increasing $\Phi \cdot N_p \cdot L_G \cdot K_C$, results in an enhanced light use efficiency but then illuminance unevenness also increases. The graphs also show that reducing the particle density or, consequently, reducing $\Phi \cdot N_p \cdot L_G \cdot K_C$, results in lowered light use efficiency but then illuminance unevenness decreases.

$\Phi \cdot N_p \cdot L_G \cdot K_C$ of not less than 1.1 and not greater than 8.2 yields a light use efficiency of 50% or more and illuminance unevenness of 150% or less. Illuminance unevenness, when reduced to 150% or less, is inconspicuous.

Thus, it will be understood that $\Phi \cdot N_p \cdot L_G \cdot K_C$ of not less than 1.1 and not greater than 8.2 yields light use efficiency above a certain level and a reduced illuminance unevenness.

Next, the optical member unit 32 will be described.

The optical member unit 32 serves to reduce the brightness unevenness of the illumination light emitted through the light exit plane 30a of the light guide plate 30 to achieve emission of light with reduced brightness unevenness through a light emission plane 24a of the main body of the lighting device 24. As illustrated in FIG. 2, the optical member unit 32 comprises a diffusion sheet 32a for diffusing the illumination light emitted through the light exit plane 30a of the light guide plate 30 to reduce brightness unevenness, a prism sheet 32b having micro prism arrays formed parallel to the lines where the light exit plane and the light entrance planes meet, and a diffusion sheet 32c for diffusing the illumination light emitted through the prism sheet 32b to reduce brightness unevenness.

The diffusion sheets 32a and 32c and the prism sheet 32b may be provided by making use, for example, of the diffusion sheets and the prism sheets disclosed in paragraphs [0028] through [0033] of JP 2005-234397 A by the Applicant of the present application.

While the optical member unit in the embodiment under discussion comprises the two diffusion sheets 32a and 32c and the prism sheet 32b between the two diffusion sheets, there is no specific limitation to the order in which the prism sheet and the diffusion sheets are arranged or the number thereof to be provided. Nor are the prism sheet and the diffusion sheets specifically limited, and use may be made of various optical members, provided that they are capable of reducing the brightness unevenness of the illumination light emitted through the light exit plane 30a of the light guide plate 30.

For example, the optical members may also be formed of transmittance adjusting members each comprising a number of transmittance adjusters consisting of diffusion reflectors distributed according to the brightness unevenness in addition to or in place of the diffusion sheets and the prism sheet described above.

Now, the reflection plate 34 of the main body of the lighting device 24 will be described.

The reflection plate 34 is provided to reflect light leaking through the first inclined plane 30b and the second inclined plane 30c of the light guide plate 30 back into the light guide plate 30 and helps enhance the light use efficiency. The reflection plate 34 is shaped according to the contour of the first inclined plane 30b and the second inclined plane 30c of the light guide plate 30 to cover the first inclined plane 30b and the second inclined plane 30c. In the embodiment under discussion, the reflection plate 34 is shaped to contour the sectionally triangular shape formed by the first inclined plane 30b and the second inclined plane 30c as illustrated in FIG. 2.

The reflection plate 34 may be formed of any material as desired, provided that it is capable of reflecting light leaking through the inclined planes of the light guide plate 30. The reflection plate 34 may be formed, for example, of a resin sheet produced by kneading, for example, PET or PP (polypropylene) with a filler and then drawing the resultant mixture to form voids therein for increased reflectance; a sheet with a specular surface formed by, for example, depositing aluminum vapor on the surface of a transparent or white resin sheet; a metal foil such as an aluminum foil or a resin sheet carrying a metal foil; or a thin sheet metal having a sufficient reflective property on the surface.

While, in the embodiment under discussion, the reflection plate 34 and the light guide plate 30 are provided as separate members, the structure of the reflection plate 34 is not limited to such a discrete member, provided that it is capable of reflecting light leaking from the light guide plate 30 back into the light guide plate. For example, a material having an effect to reflect light may be applied onto the rear side of the light guide plate opposite from the light exit plane 30a in place of the reflection plate 34. Such a configuration precludes the possibility of a space being created between the reflection plate 34 and the lower light guide reflection plates 38 as the light guide plate 30 expands or contracts and prevents leakage of light from the light guide plate 30. This improves the light use efficiency.

Upper light guide reflection plates 36 are disposed between the light guide plate 30 and the diffusion sheet 32a, i.e., on the side of the light guide plate 30 closer to the light exit plane 30a, covering the main light sources 28 and the end portions of the light exit plane 30a, i.e., the end portion thereof closer to the first light entrance plane 30d and the end portion thereof closer to the second light entrance plane 30e. Thus, the upper light guide reflection plates 36 are disposed to cover an area extending from part of the light exit plane 30a of the light guide plate 30 as far as part of the array bases 54 of the main light sources 28 in a direction parallel to the optical axis. Briefly, two upper light guide reflection plates 36 are disposed respectively on both end portions of the light guide plate 30.

The upper light guide reflection plates 36 thus provided prevents light emitted by the main light sources 28 from leaking toward the light exit plane 30a instead of entering the light guide plate 30.

Thus, light emitted from the LED chips 50 of the main light sources 28 is efficiently admitted through the first light entrance plane 30d and the second light entrance plane 30e of the light guide plate 30, increasing the light use efficiency.

The lower light guide reflection plates 38 are disposed on the side of the light guide plate 30 opposite from the light exit plane 30a, i.e., on the same side as the first inclined plane 30b and the second inclined plane 30c, covering part of the main light sources 28. The ends of the lower light guide reflection plates 38 closer to the center of the light guide plate 30 are connected to the reflection plate 34.

The upper light guide reflection plates 36 and the lower light guide reflection plates 38 may be formed of any of the above-mentioned materials used to form the reflection plate 34.

The lower light guide reflection plates 38 prevent light emitted by the light sources 28 from leaking toward the first inclined plane 30b and the second inclined plane 30c of the light guide plate 30 instead of entering the light guide plate 30.

Thus, light emitted from the LED chips 50 of the main light sources 28 is efficiently admitted through the first light entrance plane 30d and the second light entrance plane 30e of the light guide plate 30, increasing the light use efficiency.

While the reflection plate 34 is connected to the lower light guide reflection plates 38 in the embodiment under discussion, their configuration is not so limited; they may be formed of separate materials.

The shapes and the widths of the upper light guide reflection plates 36 and the lower light guide reflection plates 38 are not limited specifically, provided that light emitted by the main light sources 28 is reflected and directed toward the first light entrance plane 30d or the second light entrance plane 30e such that light emitted by the main light sources 28 can be admitted through the first light entrance plane 30d or the second light entrance plane 30e and then guided toward the center of the light guide plate 30.

While, in the embodiment under discussion, the upper light guide reflection plates 36 are disposed between the light guide plate 30 and the diffusion sheet 32a, the location of the upper light guide reflection plates 36 is not so limited; it may be disposed between the sheets constituting the optical member unit 32 or between the optical member unit 32 and the upper housing 44.

Further, the upper light guide reflection plates 36 and the lower light guide reflection plates 38 are preferably provided also on the sides of the light guide plate 30 on which the first lateral plane 30f and the second lateral plane 30g are located. Where the upper light guide reflection plates 36 and the lower light guide reflection plates 38 are provided also on the sides of the light guide plate 30 on which the first lateral plane 30f and the second lateral plane 30g are located, the light emitted by the auxiliary light sources 29 can be efficiently admitted into the light guide plate.

Next, the housing 26 will be described.

As illustrated in FIG. 2, the housing 26 accommodates and secures therein the main body of the lighting device 24 by holding it from above and both sides thereof, i.e., the light emission plane 24a and the first inclined plane 30b and the second inclined plane 30c. The housing 26 comprises the lower housing 42, the upper housing 44, the turnup members 46, and the support members 48.

The lower housing 42 is open at the top and has a configuration comprising a bottom section and lateral sections provided upright on the four sides of the bottom section. Briefly, it has substantially the shape of a rectangular box open on one side. As illustrated in FIG. 2, the bottom section and the lateral sections support the main body of the lighting device 24 placed therein from above on the underside and on the lateral sides and covers the faces of the main body of the lighting device 24 except the light emission plane 24a, i.e., the plane opposite from the light emission plane 24a of the main body of the lighting device 24 (rear side) and the lateral sections.

The upper housing 44 has the shape of a rectangular box; it has an opening at the top smaller than the rectangular light emission plane 24a of the main body of the lighting device 24 and is open on the bottom side.

As illustrated in FIG. 2, the upper housing 44 is placed from above the main body of the lighting device 24 and the lower housing 42, that is, from the light exit plane side, to cover the main body of the lighting device 24 and the lower housing 42, which holds the former, as well as four lateral sections 22b.

The turnup members 46 have a substantially U-shaped sectional profile that is identical throughout their length. That is, each turnup member 46 is a bar-shaped member having a U-shaped profile in cross section perpendicular to the direction in which it extends.

As illustrated in FIG. 2, the turnup members 46 are fitted between the lateral sections of the lower housing 42 and the lateral sections of the upper housing 44 such that the outer face of one of the parallel sections of said U shape connects with lateral sections 22b of the lower housing 42 whereas the outer face of the other parallel section connects with the lateral sections of the upper housing 44.

To connect the lower housing 42 with the turnup members 46 and the turnup members 46 with the upper housing 44, one may use any known method such as a method using bolts and nuts and a method using bonds.

Thus providing the turnup members 46 between the lower housing 42 and the upper housing 44 increases the rigidity of the housing 26 and prevents the light guide plate from warping. As a result, for example, light can be efficiently emitted without, or with a greatly reduced level of, brightness unevenness. Further, even where the light guide plate used is liable to develop a warp, the warp can be corrected with an increased certainty or the warping of the light guide plate can be prevented with an increased certainty, thereby allowing light to be emitted through the light exit plane without brightness unevenness or with a greatly reduced level of brightness unevenness.

The upper housing, the lower housing and the turnup members of the housing may be formed of various materials including metals and resins but lightweight, high-rigidity materials are preferable.

While the turnup members are discretely provided in the embodiment under discussion, they may be integrated with the upper housing or the lower housing. Alternatively, the configuration may be formed without the turnup members.

The support members 48 have an identical profile in cross section perpendicular to the direction in which they extend throughout their length. That is, each support member 48 is a bar-shaped member having an identical cross section perpendicular to the direction in which it extends.

As illustrated in FIG. 2, the support members 48 are provided between the reflection plate 34 and the lower housing 42, more specifically, between the reflection plate 34 and the lower housing 42 close to the end of the first inclined plane 30b of the light guide plate 30 on which the first light entrance plane 30d is located and close to the end of the second inclined plane 30c of the light guide plate 30 on which the second light entrance plane 30e is provided. The support members 48 thus secure the light guide plate 30 and the reflection plate 34 to the lower housing 42 and support them.

With the support members 48 supporting the reflection plate 34, the light guide plate 30 and the reflection plate 34 can be brought into a close contact. Furthermore, the light guide plate 30 and the reflection plate 34 can be secured to a given position of the lower housing 42.

While the support members are discretely provided in the embodiment under discussion, the invention is not limited thereto; they may be integrated with the lower housing 42 or the reflection plate 34. To be more specific, the lower housing 42 may be adapted to have projections to serve as support members or the reflection plates may be adapted to have projections to serve as support members.

The locations of the support members are also not limited specifically and they may be located anywhere between the reflection plate and the lower housing. To stably hold the light guide plate, the support members are preferably located closer to the ends of the light guide plate or, in the embodiment under discussion, near the first light entrance plane 30*d* and the second light entrance plane 30*e*.

The support members 48 may be given various shapes and formed of various materials without specific limitations. For example, two or more of the support members may be provided at given intervals.

Further, the support members may have such a shape as to fill the space formed by the reflection plate and the lower housing. Specifically, the support members may have a shape such that the side thereof facing the reflection plate has a contour following the surface of the reflection plate and the side thereof facing the lower housing has a contour following the surface of the lower housing. Where the support members are adapted to support the whole surface of the reflection plates, separation of the light guide plate and the reflection plate can be positively prevented and, further, generation of brightness unevenness that might otherwise be caused by light reflected by the reflection plates can be prevented.

In the planar lighting device 20, light emitted by the main light sources 28 provided on both sides of the light guide plate 30 strikes the light entrance planes, i.e., the first light entrance plane 30*d* and the second light entrance plane 30*e*, of the light guide plate 30 while light emitted by the auxiliary light sources 29 provided on the other two sides of the light guide plate 30 strikes the lateral planes, i.e., the first lateral plane 30*f* and the second lateral plane 30*g*. Then, the light admitted through the respective planes is scattered by scatterers contained inside the light guide plate 30 as will be described later in detail as the light travels through the inside of the light guide plate 30 and, directly or after being reflected by the first inclined plane 30*b* or the second inclined plane 30*c*, exits through the light exit plane 30*a*. In the process, part of the light leaking through the first inclined plane 30*b* and the second inclined plane 30*c* is reflected by the reflection plate 34 to enter the light guide plate 30 again.

Thus, light emitted through the light exit plane 30*a* of the light guide plate 30 is transmitted through the optical member 32 and emitted through the light emission plane 24*a* of the main body of the lighting device 24 to illuminate the liquid crystal display panel 12.

The liquid crystal display panel 12 uses the drive unit 14 to control the transmittance of the light according to the position so as to display characters, figures, images, etc. on its surface.

The planar lighting device 20 basically has the above configuration.

Figure 9A:
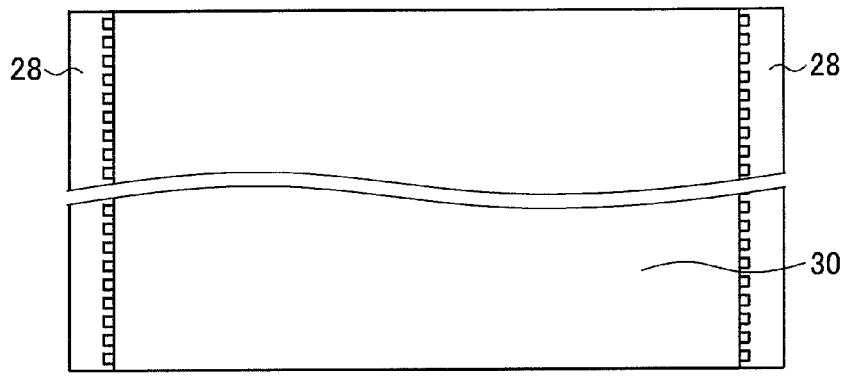
FIGS. 9A to 9D schematically illustrate configurations of typical planar lighting devices according to the invention.
Figure 9B:
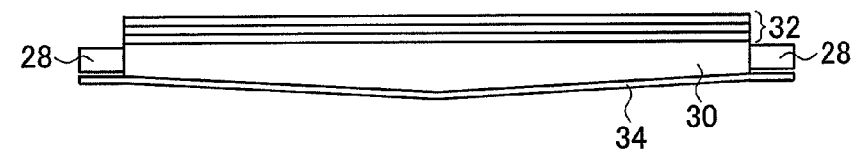
Figure 9C:
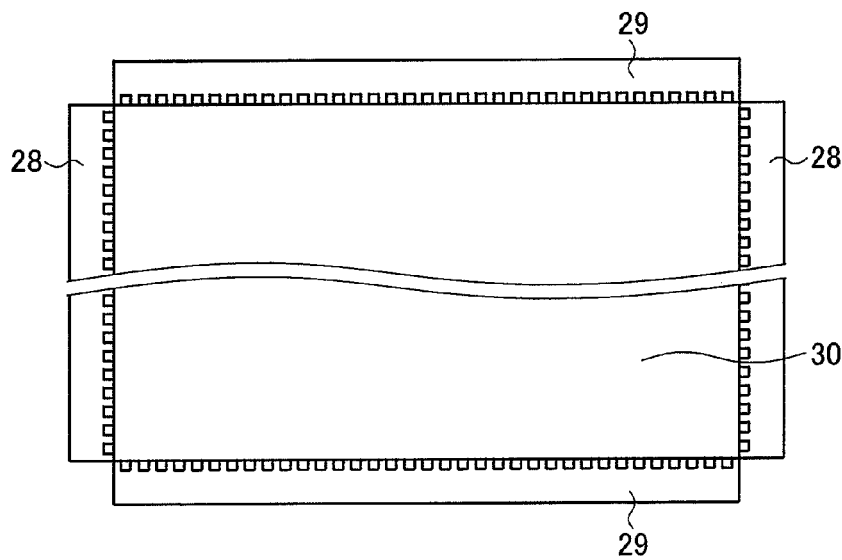
Figure 9D:

Now, measures to address problems caused by the generation of heat in the light sources (LED arrays) will be described by referring to a type of planar lighting device admitting light through light entering planes provided on two sides thereof (see FIG. 9A) from among two typical types of planar lighting devices, the other type admitting light through light entrance planes provided on the four sides thereof (see FIG. 9B).

A first problem is that an expanded light guide plate may damage the light sources (LED arrays) as the light guide plate expands as described above. Herein below will be described an example of the planar lighting device eliminating this problem and capable of protecting the light sources such as LEDs from damage.

A key feature of this example is that the light entrance planes of the light guide plate and the LEDs of the light sources 28 do not come into direct contact with each other should the light guide plate expand.

FIG. 10 illustrates a first example adapted to that end. The configuration illustrated in FIG. 10 comprises the array base 54, the light guide plate 30, the LED chips 50, and LED guard members 55 for ensuring that the light entrance planes of the light guide plate 30 and the LEDs do not come into a direct contact with each other as the light guide plate expands 30.

The LED guard members 55 are pin members each formed of such material as a metal or a hard plastic and secured to the array base 54 by, for example, implanting using screws.

The drawings referred to below do not show the optical member unit 32 and the reflection plate 34 attached to the light guide plate unless necessary.

While the number of the LED guard members 55 to be provided for the number of the LED chips 50 may be one for every three LED chips 50 as in the example shown, no specific limitation is placed thereon; one LED guard members 55 is preferably provided for every one or more LED chips 50. The distance between the LED chips 50 and the light entrance plane of the light guide plate 30 after the LED guard members 55 are installed is preferably about 0.1 mm to 0.5 mm from a viewpoint of light use efficiency.

FIG. 11A is a partially enlarged view of FIG. 10; FIGS. 11B to 11D illustrate some examples of the shape of each LED guard member 55.

Each LED guard member 55 needs to have a basic shape that does not damage the light entrance plane should the former come into contact with the light entrance plane of the light guide plate. To that end, the sectional shape of the tip of each LED guard member 55 may be circular, elliptical, or of a chamfered trapezoid as illustrated in FIGS. 11B, 11C, and 11D, respectively, but no specific limitation is placed thereon.

FIG. 12 illustrates a second example addressing the above problem. FIG. 12 illustrates the light guide plate 30, LED guard recesses or spaces 31 to prevent a direct contact between the light entrance plane of the light guide plate and the LEDs as the light guide plate 30 expands, and the array base 54. Also shown are projections (abutments) 33 formed as a result of providing the LED guard recesses 31. The projections 33 have the same function as the LED guard members.

Since the projections (projecting abutments) 33 formed as a result of providing the LED guard recesses 31 perform substantially the same function as the LED guard members 55 provided in the example of FIG. 11 whereby the direct contact between the light entrance plane of the light guide plate and the LEDs is prevented as the light guide plate 30 expands, the same effect can be produced by the LED guard recesses 31 provided in the example illustrated in FIG. 12.

The distance between the LED chips 50 and the light entrance plane of the light guide plate 30 after the LED guard recesses 31 are installed is preferably about 0.1 mm to 0.5 mm from a viewpoint of light use efficiency.

Figure 13A:
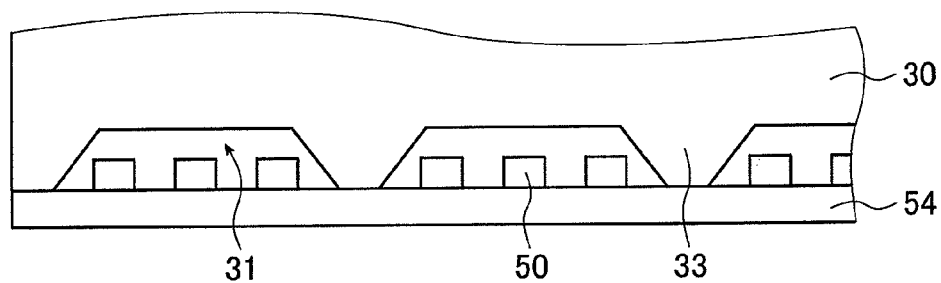
FIGS. 13A to 13C are enlarged views illustrating part of the structure of FIG. 12 and of other examples in detail.
Figure 13B:
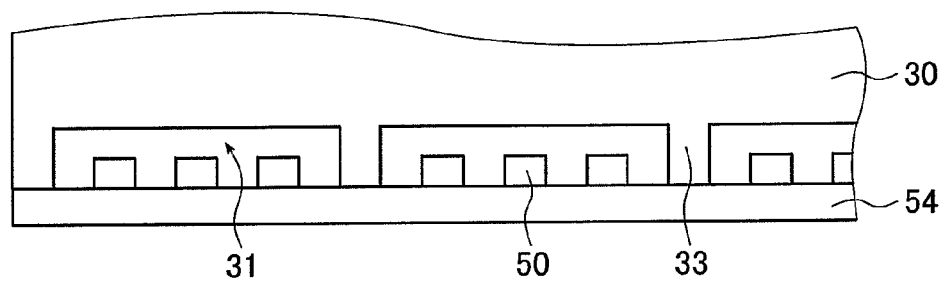
Figure 13C:
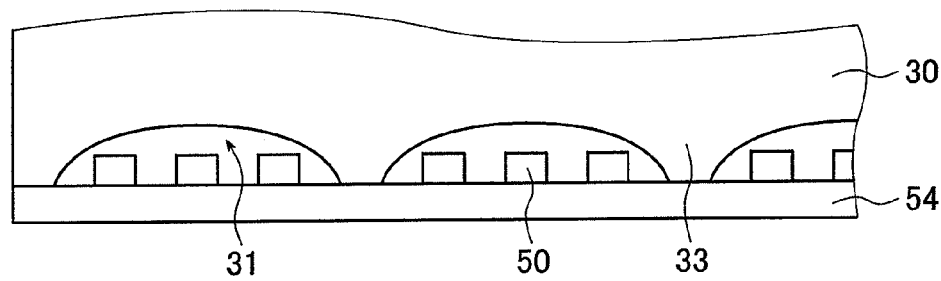

FIGS. 13A to 13C illustrate some examples of the shape of the LED guard recesses 31 of FIG. 12.

The LED guard recesses 31 need to have a basic shape that does not damage the LED chips 50 should the projections 33 come into contact with the array base 54. To that end, the sectional shape of each LED guard recess 31 may be trapezoidal, rectangular, or elliptical as illustrated in FIGS. 13A, 13B, and 13C, respectively, but no specific limitation is placed thereon according to the invention.

Figure 14:
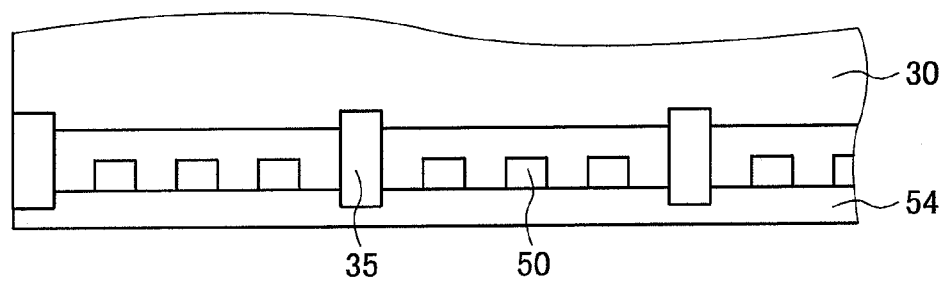
FIG. 14 illustrates yet another example of the structure of FIG. 12 in detail and partially enlarged.

FIG. 14 illustrates a third example addressing the above problem. The example illustrated in FIG. 14 is different from the above examples in that discrete pins are used to engage the light guide plate 30 with the array base 54 unlike the projections provided in the preceding examples. Specifically, the example of FIG. 14 uses threaded pins 35 performing the same function after installment as the LED guard members 55 and the projections 33 described above.

The threaded pins 35, for example, have a threaded portion on both ends thereof for screwing the pins 35 into the array base 54 or the light entrance planes of the light guide plate 30.

Alternatively, only one end of the threaded pins 35 be threaded; in that case, the other end opposite from the threaded end need only have an effect of preventing lateral displacement of the light entrance plane of the light guide plate 30 with respect to the array base 54 as it is inserted into a hole formed in the light entrance plane of the light guide plate 30 or the array base 54.

Now, a second problem, as described above, is that the amount of light emitted by the LEDs used as a light source decreases unless the heat generated in the light source is efficiently released.

While the problem caused by the expansion of the light guide plate as earlier described and related to the heat generated by the light source is an independent problem from the problem of the decrease in the amount of light emitted by the LEDs, combining separate solutions to the respective problems to address both problems will better serve the purpose when the two problems are correlated to each other. Accordingly, examples of planar lighting device where these two problems can be solved will be described below. Note, however, that the invention is not limited to these examples.

The problem of decrease in the amount of light emitted by the LEDs was addressed conventionally by releasing heat through heat sinks connected to the array base carrying the LEDs. However, release of heat relying solely upon heat sinks could not always achieve effective enough heat dissipation; there were cases where the light emission efficiency decreased because of the heat accumulation near the array base depending upon climatic conditions or changes in operating conditions.

The inventor of the present invention studied the possibilities of various heat dissipation methods in order to devise more efficient heat dissipation methods. Some of these methods found to be particularly effective will be described below referring to specific examples.

FIG. 15 illustrates a first of such examples. This is an example based upon the planar lighting device of FIG. 10 comprising the LED guard members 55 for preventing a direct contact between the light entrance plane of the light guide plate 30 and the LEDs as the light guide plate 30 expands, further added with heat sinks 60, exhaust ducts or air supply ducts 57, and fans 59, for encouraging heat dissipation.

FIG. 15A is a top plan view of the planar lighting device, FIG. 15B is an elevation taken along line C-C of FIG. 15A, and FIG. 15C is an elevation as seen from the right-hand side of FIG. 15B. Note that the light guide plate 30 is not shown in FIGS. 15B and 15C.

The example of the planar lighting device of FIG. 15 has a configuration where the heat sinks 60 are connected on a surface of the respective array bases 54 located on the same side as the underside of the light guide plate 30 to release heat generated in the LED chips 50 and transferred to the array bases 54 via the heat sinks 60 toward the center of the light guide plate 30, further provided with exhaust ducts 57 each having a shape extending along each heat sink 60 on the rear surface of the heat sink 60, i.e., on the underside of the light guide plate 30, as well as the fans 59 connected to the exhaust ducts 57.

In this example, heat is absorbed from the heat sinks 60 provided in contact with the exhaust ducts 57 through the contact surface thereof as cooling air supplied into the exhaust ducts 57 (indicated by white, upward arrows in FIG. 15B) by the fans 59 passes through the exhaust ducts 57 to be discharged at the lateral ends. Thus, the example shown achieves the effect of releasing heat generated by the LED chips 50 by the intermediate of the array bases 54 to the outside of the device (indicated by white horizontal arrows in FIGS. 15A and 15B).

The surface areas of the inside of the exhaust ducts 57 and the heat sinks 60 are preferably increased to improve the heat dissipation efficiency by various methods known in the art. Methods that may be used to increase the surface areas include surface machining and surface treatment such as hairline surface treatment, sandblasting, and, where aluminum is used, alumite treatment.

It is also preferable to produce laminar air flow through the exhaust ducts 57 and the heat sink 60, for example, a plurality of fins constituting the heat sink 60, to increase the speed of the air flow therethrough in order to enhance the heat dissipation efficiency.

While, in the example described above, air flow caused by the fans 59 runs in a direction such that external air sucked by the fans 59 from below the device flows through the exhaust ducts 57 to be discharged to the outside (rightward and leftward directions in FIGS. 15A and 15B), the direction may be reversed such that the fans 59 suck external air from the openings of the exhaust ducts 57 located at the lateral sides of the device, allowing the air to pass through the exhaust ducts 57 and be discharged through the fans 59 to the outside (downwardly in FIG. 15B).

Figure 17:
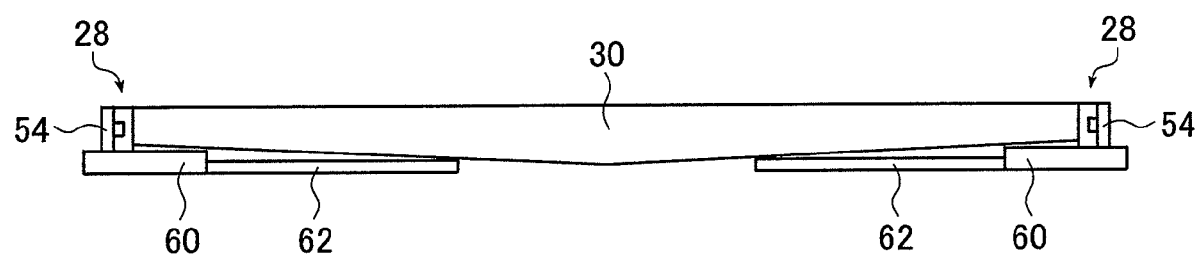
FIG. 17 illustrates a third example of the structure encouraging dissipation of heat generated by the LEDs.

FIGS. 16 and 17 illustrate a second example. The example of FIGS. 16 and 17 is the planar lighting device of FIG. 10 comprising the LED guard members 55 for preventing a direct contact between the light entrance plane of the light guide plate 30 and the LEDs as the light guide plate 30 expands, further added with the heat sinks 60 and heat pipes 62 each having the form of a thin layer extending toward the center of the light guide plate 30 and connected to the heat sinks 60, for encouraging heat dissipation.

FIG. 16A is a top plan view of the light guide plate, FIG. 16B is an elevation taken along line D-D of FIG. 16A, and FIG. 16C is an elevation as seen from the right-hand side of FIG. 16B; FIG. 17 is an elevation as seen from the right-hand side of FIG. 16A. Note that the light guide plate 30 is not shown in FIGS. 16B and 16C. According to this example, each heat pipe 62 has the shape of a flat bar measuring about 1 mm in thickness and about 10 mm in width but no specific limitation is placed thereon, provided that it has dimensions that can be inserted into the space between the light guide plate 30 and the lower housing.

The planar lighting device according to this example is configured such that as illustrated in FIGS. 16 and 17, heat pipes 62 each having the shape of a flat bar and having dimensions that can be inserted into the space beneath the array base 54 and the light guide plate 30 are provided at given intervals on the face of the heat sinks 60 facing the center of the light guide plate 30 substantially throughout the length of the array bases. The heat pipes 62 extend along the underside of the light guide plate 30 such that the tips thereof opposite from the heat sink 60 to which the heat pipes 62 are connected are located close to the center of the light guide plate 30.

In the above example of the planar lighting device having the above configuration, the heat generated in the LEDs 50 is conducted to the heat sink 60 via the array base 54 or, more specifically, to the part of the heat sink 60 closer to the array base 54, and further on from the other end of the heat sinks 60 or, more specifically, the end thereof closer to the center of the light guide plate 30, to the heat pipes 62. In the process, heat dissipation takes place over a broad region from the part of the heat sink 60 closer to the LED base 54 as far as the tips of the heat pipes 62, i.e., the part thereof closest to the center of the light guide plate 30. The efficient heat dissipation thus achieved prevents the temperature of the LEDs 50 from rising excessively.

As mentioned above, the LED guard members, projections or LED guard recesses provided for the light sources 28 in the examples of FIGS. 15 to 17 to prevent the direct contact between the light entrance plane of the light guide plate 30 and the LEDs as the light guide plate 30 expands are not essential to the planar lighting device of the invention; such heat dissipation structure can be employed without the combined use of the LED guard members, the projections (abutments) or recesses and produce remarkable effects by itself: it can efficiently release the heat generated in the light source, prevent the decrease in the amount of light emitted by the LEDs and prevent the damage of the LEDs by limiting the rise of the temperature of the light guide plate 30 to ensure that the light entrance plane of the light guide plate 30 and the LEDs do not come into direct contact with each other should the light guide plate 30 expand.

FIG. 18 illustrates another configuration for limiting the rise of the temperature of the light guide plate 30.

The planar lighting device according to this example comprises a thin suction duct 64 between the underside of the light guide plate 30 (planar lighting device) and a power supply casing 49 that is otherwise mounted thereto. The duct 64 also serves as a separation wall to encourage heat dissipation in the light guide plate 30 and the power supply casing 49. The duct 64 is provided where it is in contact with external air with the fans 59 for air ventilation or air discharge. FIG. 18A illustrates the underside of the device; FIG. 18B is an elevation as seen from the right-hand side of the FIG. 18A.

According to the example of the planar lighting device under discussion, the effect of releasing the heat generated in both the light guide plate 30 (planar lighting device) and the power supply casing 49 to the outside is achieved by discharging through the fans 59 (exhaust fans in this example) external air that is warmed as it absorbs heat from the light guide plate 30 (planar lighting device) and the power supply casing 49 and which is collected by the fans 59 through the duct 64 disposed between the light guide plate 30 (planar lighting device) and the power supply casing 49.

Thus, remarkable effects can be produced: the damage of the LEDs is prevented by limiting the rise of the temperature of the light guide plate 30 to ensure that the light entrance planes of the light guide plate 30 and the LEDs do not come into a direct contact with each other should the light guide plate 30 expand; in addition, encouraging heat dissipation in the power supply casing 49 prevents an out-of-control operation of the device caused by an excessive temperature rise of the power supply casing 49.

While in the above example, the air flow is caused by the fans 59 in directions such that external air is sucked through the openings of the duct 64 located at the lateral sides of the device, passes the inside of the duct 64, and is discharged through the fans 59 to the outside (in the direction perpendicular to FIG. 18A and away therefrom, which corresponds to the downward direction as the device is actually installed), the directions may be reversed such that external air sucked upwardly from below the device by the fans 59 passes the duct 59 to be discharged to the outside toward the right and the left as seen in FIG. 18A.

The surface area of the inside of the duct 64 is preferably increased by various methods known in the art to improve the heat dissipation efficiency. Methods that may be used to increase the surface area include surfaces machining and surface treatment such as hairline surface treatment, sandblasting, and, where aluminum is used, alumite treatment.

Preferably, laminar air flow is produced through the exhaust duct 64 to increase the speed of the air flow in order to improve the heat dissipation efficiency.

Figures 19A, 19B:
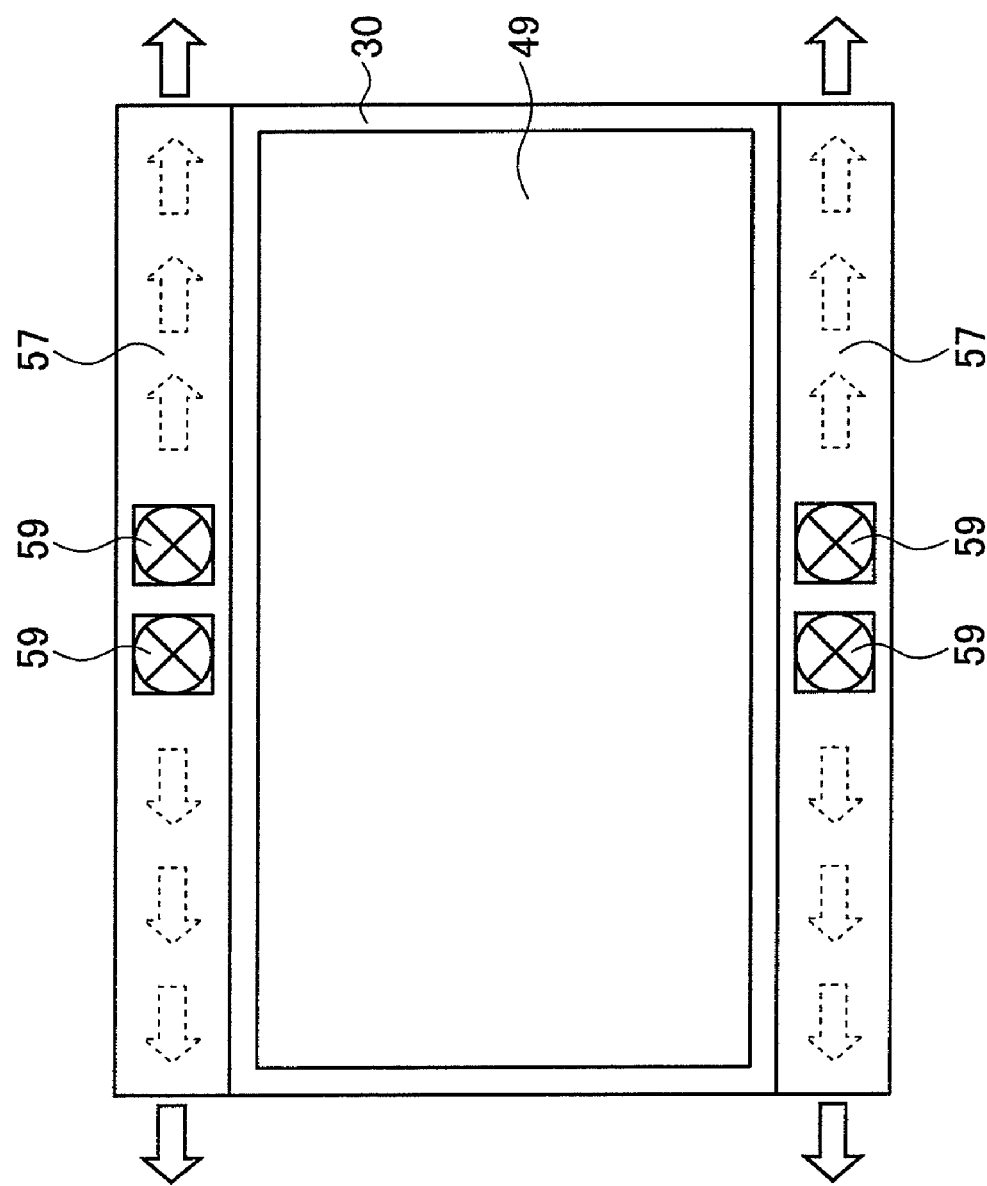
FIGS. 19A and 19B illustrate a fifth example of the structure encouraging dissipation of heat generated by the LEDs.

FIG. 19 illustrates a modification of the example of FIG. 18 provided with the exhaust ducts 57 on the underside of the light guide plate 30 (planar lighting device) to encourage heat dissipation in the light guide plate 30 (planar lighting device) such that each duct 57 is connected to the air supply fans 59 provided in the lengthwise central area of the light guide plate 30 (planar lighting device). FIG. 19A is a bottom view of the device; FIG. 19B is an elevation as seen from the right-hand side of FIG. 19A.

While the device according to the example of FIG. 19 does not directly produce a considerable effect upon heat dissipation in the power supply casing 49, heat dissipation in the light guide plate 30 (planar lighting device) thereby encouraged contributes to no small extent to the heat dissipation in the power supply casing 49 as well.

Note that the air supply direction may be reversed also in the example of FIG. 19.

The surface area of the inside of the ducts 57 in the above example also is preferably increased by various methods known in the art to improve the heat dissipation efficiency. Methods that may be used to increase the surface areas include of surface machining and surface treatment such as hairline surface treatment, sandblasting, and, where aluminum is used, alumite treatment.

Preferably, laminar air flow is produced through the exhaust duct 64 to increase the speed of the air flow in order to improve the heat dissipation efficiency.

Figure 21:
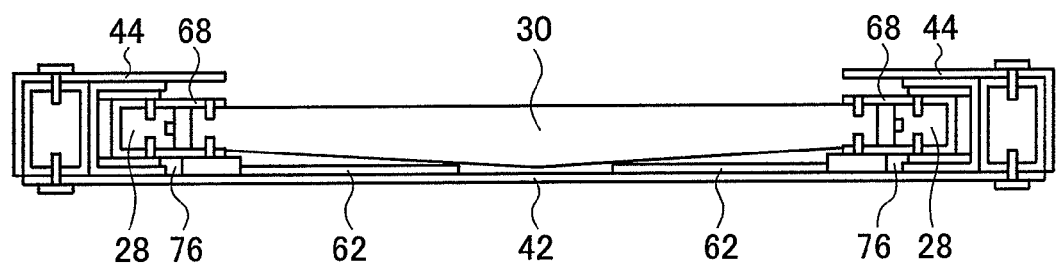
FIG. 21 schematically illustrates a fourth example having a structure whereby damage of the LEDs due to the expansion of the light guide plate is prevented.

FIGS. 20 and 21 illustrate other examples of the planar lighting device described earlier referring to FIGS. 11 to 14 capable of preventing the light guide plate from damaging the light sources (LED arrays) as the light guide plate expands.

A key feature of this example is that the LEDs of the light sources 28 are adapted to move in synchronism with the expansion or contraction of the light guide plate as the light guide plate expands or contracts to prevent a direct contact between the light entrance planes of the light guide plate and the LEDs of the light sources 28.

First, the basic configuration of the device will be described by referring to FIG. 20.

Figure 20A:
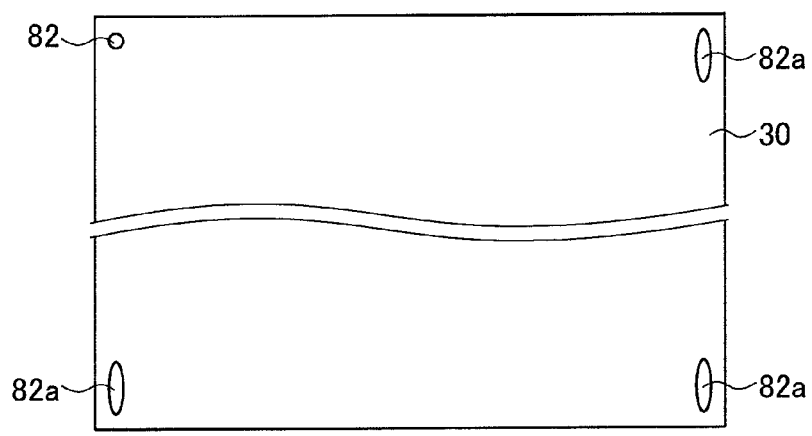
FIGS. 20A to 20D schematically illustrate a third example having a structure whereby damage of the LEDs due to the expansion of the light guide plate is prevented.
Figure 20B:
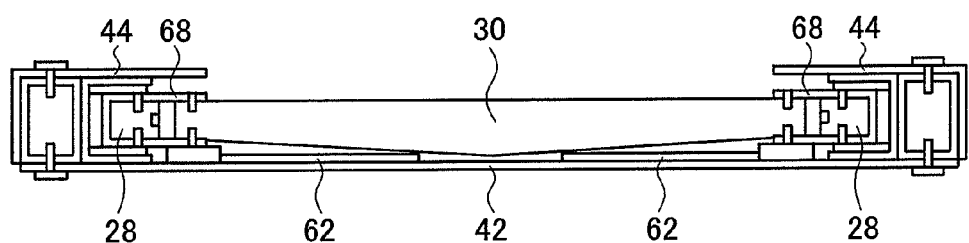

FIG. 20B schematically illustrates the configuration of the planar lighting device according to the example presently under discussion. A key feature of this configuration is that the light guide plate 30 and the light source 28, the latter being provided adjacent two opposite planes of the light guide plate, the right-hand and left-hand planes as seen in FIG. 20B, and hence numbering two, are secured with respect to each other by pins inside the device, whereas the light guide plate 30 and the light source 28 thus secured are adapted to be movable inside the device.

Description thereof will be made in more detail below.

Figure 20C:
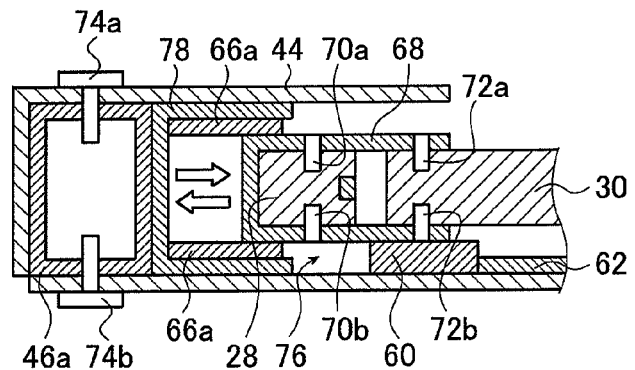

In the device illustrated in FIG. 20B, the light guide plate 30 and the light source 28 are secured to U-shaped members 68 using appropriate threaded pins 70a, 70b, 72a and 72b screwed from above and below as illustrated in FIG. 20C, which illustrates the configuration of one end of the device enlarged. Further, the light guide plate 30 and the light source 28 thus integrated are fitted into and held between friction members 66a that are in turn bonded to the upper and lower inner surfaces of the housing in order to absorb the expansion and the contraction.

While the friction members 66a may be formed of any generally used material having an appropriate anti-friction coefficient, a material producing few wear particles and highly insusceptible to dimensional variation is a preferred choice. For example, POM (polyacetal) and PA (polyamide) are preferably used.

Figure 20D:
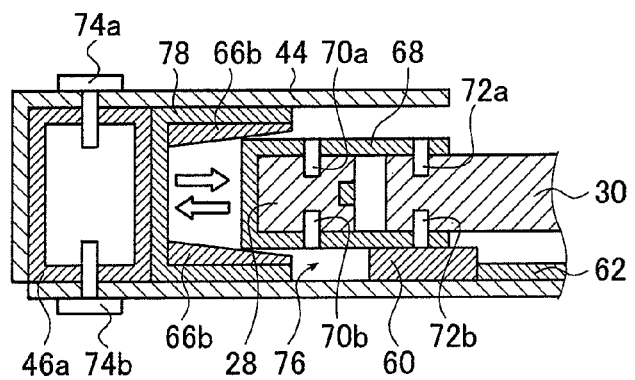

An example illustrated in FIG. 20D has substantially the same configuration as the configuration of FIG. 20C except for the friction members into which the light guide plate 30 and the light source 28 as integrated are inserted and therein held; friction members 66b illustrated in FIG. 20D are tapered as compared with the friction members 66a of FIG. 20C, which are flat. The effects produced by the configuration of FIG. 20D are that the displacement of the light guide plate 30 can be evened out in the directions toward both ends and the friction can be adjusted according to the amount of expansion and contraction of the light guide plate 30.

In FIGS. 20C and 20D, a reference character 78 denotes a support member for securing the friction members 66a or 66b to the upper and the lower parts of the housing. A reference character 46a denotes a modification of the turnup member 46 having a different shape and additionally given a function to hold the support member 78 (friction members 66a or 66b) in a given position with the upper housing 44 and the lower housing 42. Reference characters 74a and 74b denote fixing screws used to secure the member 46a.

FIG. 20A illustrates an example providing a solution to the deformation of the light guide plate due to heat or rise in temperature, whereby the expansion of the light guide plate 30 is absorbed not in the direction opposing the light sources as in the earlier described solution but in a direction perpendicular thereto.

A key feature of the configuration illustrated in FIG. 20A is that the expansion and the contraction of the light guide plate 30 in the direction perpendicular to the direction toward the right and the left in FIG. 20B, i.e., in the direction perpendicular to FIG. 20B, is absorbed by a circular hole 82 and holes 82a elongated in the pertinent direction.

FIG. 21 illustrates another example, where, inside the device, the light guide plate 30 and two light sources 28 are secured with respect to each other by pins as in the example of FIG. 20B. In addition, one of the two end portions of the light guide plate 30 is secured to the inside of the device, allowing only the other end portion to move.

The movable side, where the light guide plate 30 and the light source 28 secured with respect to each other by means of pins are movably or slidably received, may have one of the configurations of the preceding examples illustrated in FIGS. 20C and 20D. Alternatively, any other configuration may be used, provided that substantially the same function is achieved.

The above configuration provides a simplified mechanism to effect movement and is effective to reduce the costs of the device.

In FIGS. 20C, 20D, and 21, a reference character 76 denotes a space provided so as not to hinder the heat sink 60 and the heat pipes 62 attached on the underside of the light guide plate 30 by the intermediate of the U-shaped support member 68 from moving as the light guide plate 30 expands or contracts as the temperature changes.

For ease of understanding, the above examples of the present invention has been described by referring to the type of planar lighting device admitting light through light entering planes provided on two sides thereof from among two types of planar lighting devices, the other type admitting light through light entrance planes provided on the four sides thereof. As mentioned above, however, the invention can also be suitably applied to the planar lighting device of the type admitting light through the four sides. Where the invention is applied to the planar lighting device of the type admitting light through the four sides, the above configuration may be provided in each of the two mutually orthogonal directions.

While the basic configuration of the inventive planar lighting device has been described above in detail, the invention is not limited in any manner to the above embodiment and examples and various improvements and modifications may be made without departing from the spirit of the present invention.

What is claimed is:

1. A planar lighting device comprising:
   a pair of light sources;
   a light guide plate being disposed between said pair of light sources and having a sectional shape in a form of a reversed wedge growing wider in a direction in which light beam emitted by each of said pair of light sources travels, said light guide plate including:
     a light exit plane; and
     a pair of light entrance planes, each being provided opposite to each of said pair of light sources;
   a housing for accommodating said pair of light sources and said light guide plate;
   heat sinks, each for absorbing heat generated by each of said pair of light sources, and each being connected to each of said pair of light sources; and
   heat pipes, each for releasing said heat absorbed by each of said heat sinks toward a center area of said housing, and each being disposed on a face of each of said heat sinks so as to extend toward said center of said housing.

2. The planar lighting device according to claim 1, wherein a part or a whole of a cover on a rear side of said housing is subjected to surface treatment to increase a surface area of said part or said whole of said cover.

3. The planar lighting device according to claim 1, wherein said heat sinks are subjected to surface treatment to increase a surface area of said heat sinks.

4. The planar lighting device according to claim 1,
   wherein each of said pair of light sources has LED chips and a support for supporting said LED chips, and
   wherein said LED chips of each of said pair of light sources are disposed in a row on a plane of said support facing a corresponding light entrance plane of said light guide plate.

5. The planar lighting device according to claim 4, wherein each of said pair of light sources further has projections, each being higher than a height of each of said LED chips, and being provided parallel to an optical axis of light emitted by said LED chips for every one or more LED chips in said LED chips of each of said pair of light sources.

6. The planar lighting device according to claim 4, wherein said light guide plate further has recesses, each being deeper than a height of each of said LED chips, and being provided in each of said pair of light entrance planes of said light guide plate for every one or more LED chips in said LED chips of each of said pair of light sources.

7. The planar lighting device according to claim 4, further comprising gap setting members, each for setting a gap higher than a height of each of said LED chips, and being provided for every one or more LED chips between each of said pair of light entrance planes of said light guide plate and said support of each of said pair of light sources.

8. A planar lighting device comprising:
   a pair of light sources;
   a light guide plate being disposed between said pair of light sources and having a sectional shape in a form of a reversed wedge growing wider in a direction in which light beam emitted by each of said pair of light sources travels, said light guide plate including:

a light exit plane; and
a pair of light entrance planes provided opposite each of said pair of light sources;
a housing for accommodating said pair of light sources and said light guide plate;
heat sinks, each for absorbing heat generated by each of said pair of light sources, and each being connected to each of said pair of light sources;
first ducts, each for releasing said heat absorbed by each of said heat sinks, and each being disposed near each of said heat sinks; and
fans, each for discharging said heat released in each of said first ducts to an outside, and each being connected to each of said first ducts.

9. The planar lighting device according to claim 8, wherein said heat sinks are subjected to surface treatment to increase a surface area of said heat sinks.

10. The planar lighting device according to claim 8,
wherein each of said pair of light sources has LED chips and a support for supporting said LED chips, and
wherein said LED chips of each of said pair of light sources are disposed in a row on a plane of said support facing a corresponding light entrance plane of said light guide plate.

11. The planar lighting device according to claim 10, wherein said heat sinks and said first ducts have grooves or ridges in a direction in which said LED chips are arranged.

12. The planar lighting device according to claim 10, wherein each of said pair of light sources further has projections, each being higher than a height of each of said LED chips, and being provided parallel to an optical axis of light emitted by said LED chips for every one or more LED chips in said LED chips of each of said pair of light sources.

13. The planar lighting device according to claim 10, wherein said light guide plate further has recesses, each being deeper than a height of each of said LED chips, and being provided in each of said pair of light entrance planes of said light guide plate for every one or more LED chips in said LED chips of each of said pair of light sources.

14. The planar lighting device according to claim 10, further comprising gap setting members, each for setting a gap higher than a height of each of said LED chips, and being provided for every one or more LED chips between each of said pair of light entrance planes of said light guide plate and said support of each of said pair of light sources.

15. A planar lighting device comprising:
a pair of light sources;
a light guide plate being disposed between said pair of light sources and having a sectional shape in a form of a reversed wedge growing wider in a direction in which light beam emitted by each of said pair of light sources travels, said light guide plate including:
a light exit plane; and
a pair of light entrance planes provided opposite each of said pair of light sources;
a housing for accommodating said pair of light sources and said light guide plate;
a power supply casing mounted on an underside of said housing;
a second duct serving as a separation wall, said second duct for releasing heat generated by said pair of light sources from said underside of said housing as well as heat generated by said power supply casing, and being provided between said underside of said housing and said power supply casing; and
exhaust means for discharging said heat released in said second duct to an outside, and being provided in said second duct close to a central area of said housing.

16. The planar lighting device according to claim 15,
wherein each of said pair of light sources comprises LED chips and a support for supporting said LED chips, and
wherein said LED chips of each of said pair of light sources are arrayed on a plane of said support facing each of said pair of light entrance planes in a longitudinal direction of each of said pair of light entrance planes.

17. The planar lighting device according to claim 16, wherein each of said pair of light sources further comprises projections, each being higher than a height of each of said LED chips, and being provided parallel to an optical axis of light emitted by said LED chips for every one or more LED chips in said LED chips of each of said pair of light sources.

18. The planar lighting device according to claim 16, wherein said light guide plate further comprises recesses, each being deeper than a height of each of said LED chips, and being provided in each of said pair of light entrance planes of said light guide plate for every one or more LED chips in said LED chips of each of said pair of light sources.

19. The planar lighting device according to claim 16, further comprising gap setting members, each for setting a gap higher than a height of each of said LED chips, and being provided for every one or more LED chips between each of said pair of light entrance planes of said light guide plate and said support of each of said pair of light sources.

20. The planar lighting device according to claim 15, wherein said exhaust means comprises a fan.

21. The planar lighting device according to claim 1, further comprising:
a power supply casing mounted on an underside of said housing;
a second duct serving as a separation wall, said second duct for releasing said heat from said underside of said housing as well as heat generated by said power supply casing, and being provided between said underside of said housing and said power supply casing; and
exhaust means for discharging said heat released in said second duct to an outside, and being provided in said second duct close to said central area of said housing.

22. The planar lighting device according to claim 1, further comprising:
a power supply casing mounted on an underside of said housing;
a second duct serving as a separation wall, said second duct for releasing said heat from said underside of said housing as well as heat generated by said power supply casing, and being provided between said underside of said housing and said power supply casing; and
exhaust means for discharging said heat released in said second duct to the outside, and being provided in said second duct close to a central area of said housing.

* * * * *